United States Patent [19]

Takaragi et al.

[11] Patent Number: 5,117,458
[45] Date of Patent: May 26, 1992

[54] SECRET INFORMATION SERVICE SYSTEM AND METHOD

[75] Inventors: Kazuo Takaragi, Ebina; Ryoichi Sasaki, Fujisawa; Tsutomu Nakamura, Musashino; Minoru Koizumi, Yokohama; Yasuko Fukuzawa, Sagamihara; Kenji Kataoka, Yokohama, all of Japan

[73] Assignee: Hitachi, Ltd., Tokyo, Japan

[21] Appl. No.: 606,898

[22] Filed: Oct. 31, 1990

[30] Foreign Application Priority Data

Nov. 1, 1989 [JP] Japan .................................. 1-282960
Jun. 4, 1990 [JP] Japan .................................. 2-144305

[51] Int. Cl.⁵ ........................................... H04L 9/00
[52] U.S. Cl. ........................................ 380/4; 380/23; 380/25
[58] Field of Search .............. 380/4, 23, 25, 48, 49, 380/50; 364/242.95; 340/825.34

[56] References Cited

U.S. PATENT DOCUMENTS

| 4,223,403 | 9/1980 | Konheim et al. ............ 340/825.34 |
| 4,787,025 | 11/1988 | Cheselka et al. ............ 364/242.95 X |
| 4,924,513 | 5/1990 | Herbison et al. ................ 380/25 X |
| 4,995,112 | 2/1991 | Aoyama ............................... 380/25 |
| 5,018,196 | 5/1991 | Takaragi et al. ................ 380/25 X |
| 5,031,211 | 7/1991 | Nagai et al. .................... 380/25 X |

Primary Examiner—Tod R. Swann
Attorney, Agent, or Firm—Antonelli, Terry, Stout & Kraus

[57] ABSTRACT

An information service system including a plurality of receiving stations and information service facilities. The information service facilities include a memory circuit which stores beforehand a distribution destination information set of receiving station identifiers allocated to the receiving stations, distribution destination information set being disposed in a predetermined order within the memory circuit, a memory circuit for storing a plurality of information to be supplied to receiving stations, an enciphering circuit for generating an enciphering key for optical receiving stations within a group which performs broadcast communications, and enciphering the service information with the enciphering key, and a circuit for transmitting the enciphered service information and service destination codes of service destination receiving stations encoded from the distribution destination information set, through broadcast communications. Each receiving station includes a memory circuit for storing beforehand its own identifier and the distribution destination information set of the group which performs broadcast communications, a receiver unit for receiving the enciphered service information and the service destination codes from the information service facilities, and a deciphering circuit for generating a deciphering key corresponding to the distribution destination information set in accordance with the received service destination codes and the corresponding, and previously stored distribution destination information, only when the own identifier of the receiving station is contained in the service destination codes, and the deciphering the enciphered service information with the deciphering key.

19 Claims, 21 Drawing Sheets

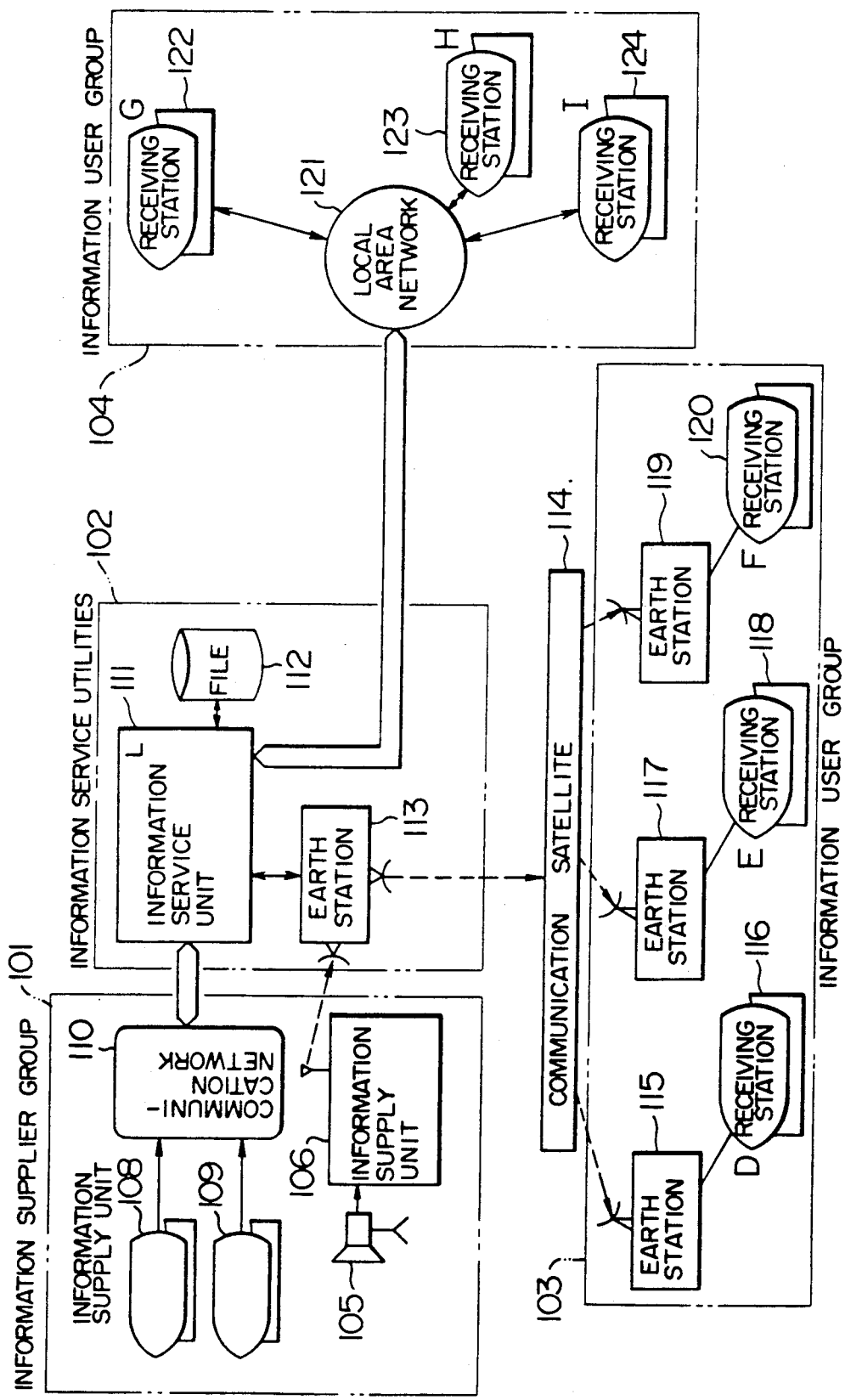

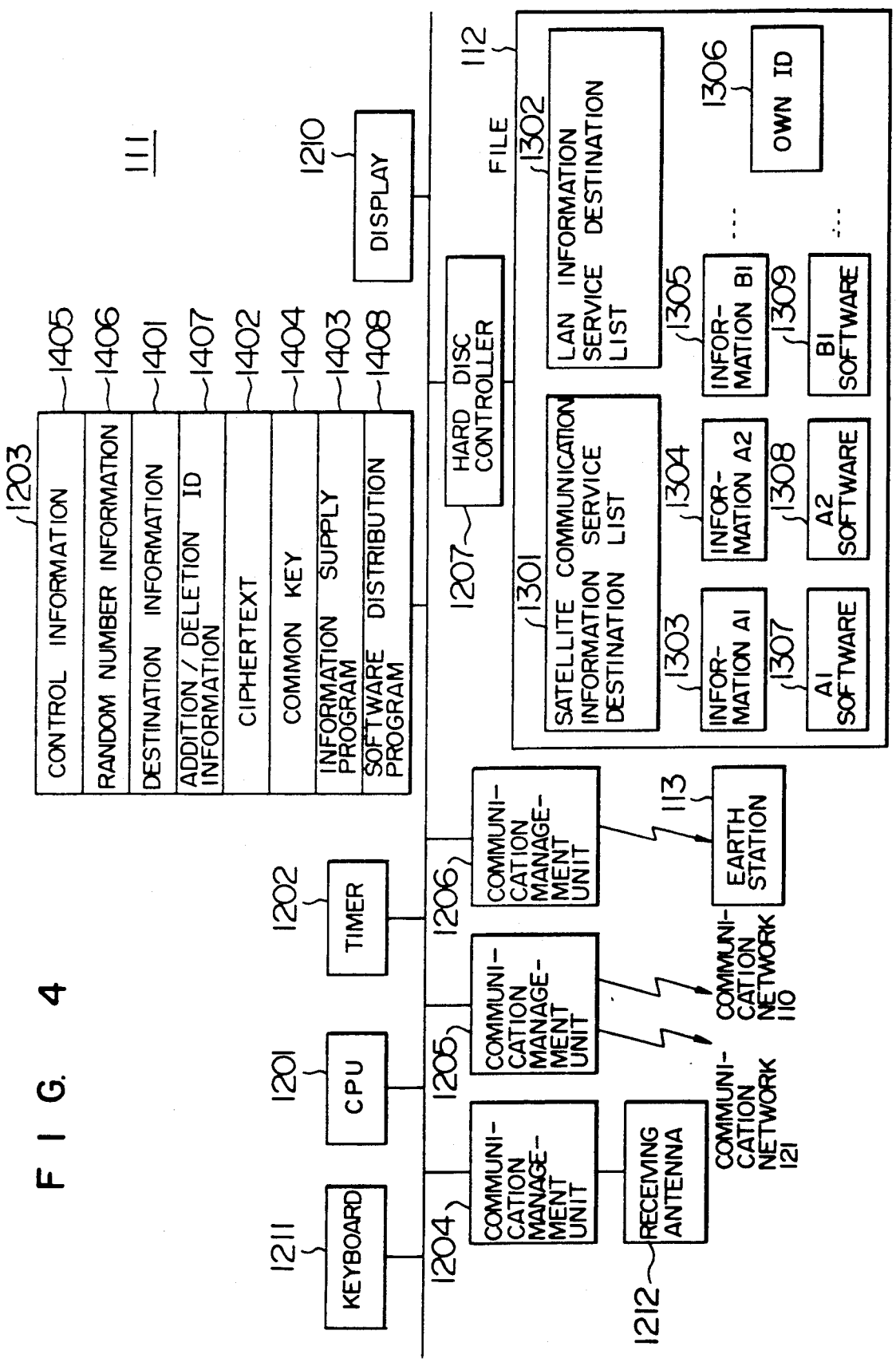

FIG. 6A

SATELLITE COMMUNICATION INFORMATION SERVICE DESTINATION LIST — 1301

| INFORMATION \ ID | NO 1 D | 2 E | 3 F | 4 L | ... |
|---|---|---|---|---|---|
| $A_1$ | 1 | 1 | 0 | 1 | |
| $A_2$ | 0 | 1 | 1 | 1 | |
| $B_1$ | 0 | 1 | 1 | 1 | |
| $B_2$ | 0 | 0 | 1 | 1 | |
| AI SOFTWARE | 1 | 1 | 0 | 1 | |
| | | | | | |

FIG. 6B

LAN INFORMATION SERVICE DESTINATION LIST — 1302

| INFORMATION \ ID | NO 1 G | 2 H | 3 I | 4 L | ... |
|---|---|---|---|---|---|
| $A_1$ | 0 | 0 | 1 | 1 | |
| $A_2$ | 1 | 1 | 1 | 1 | |
| $B_1$ | 1 | 0 | 1 | 1 | |
| $B_2$ | 1 | 1 | 0 | 1 | |
| AI SOFTWARE | 0 | 0 | 1 | 1 | |
| | | | | | |

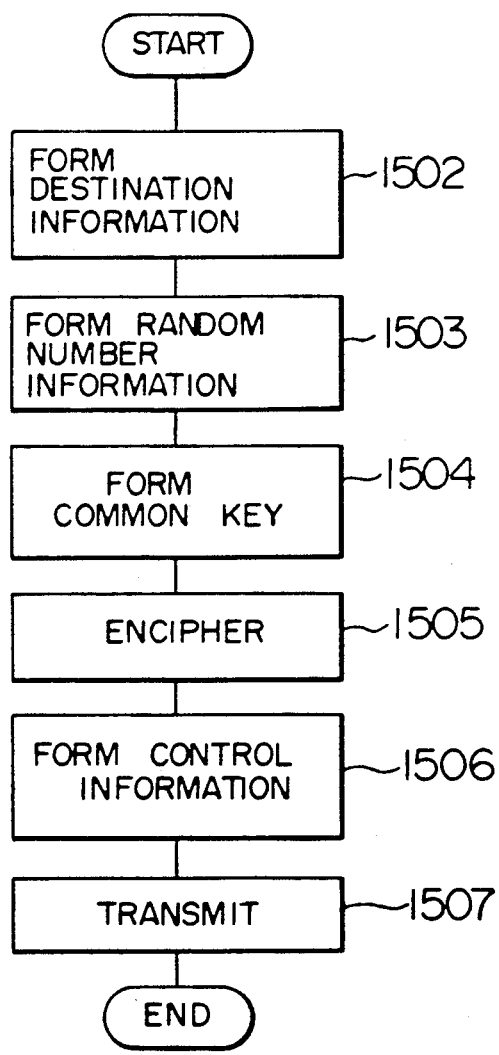
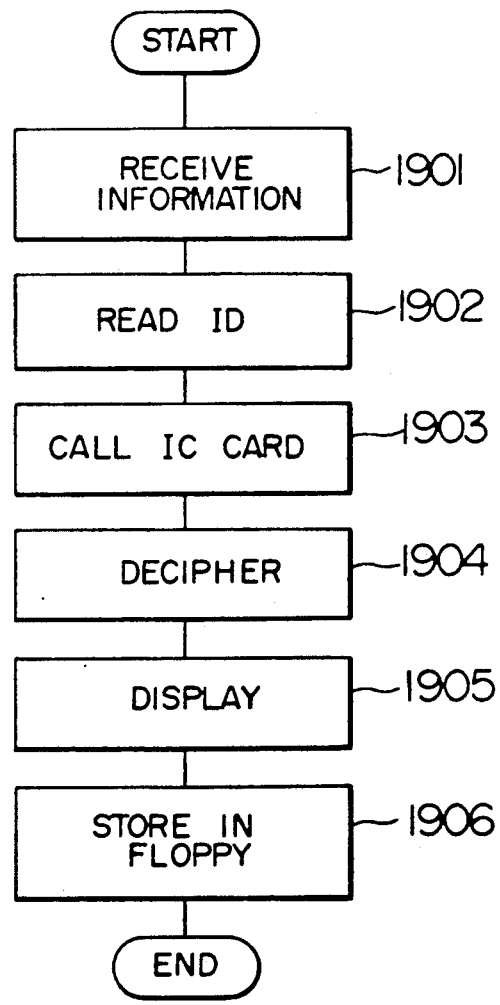

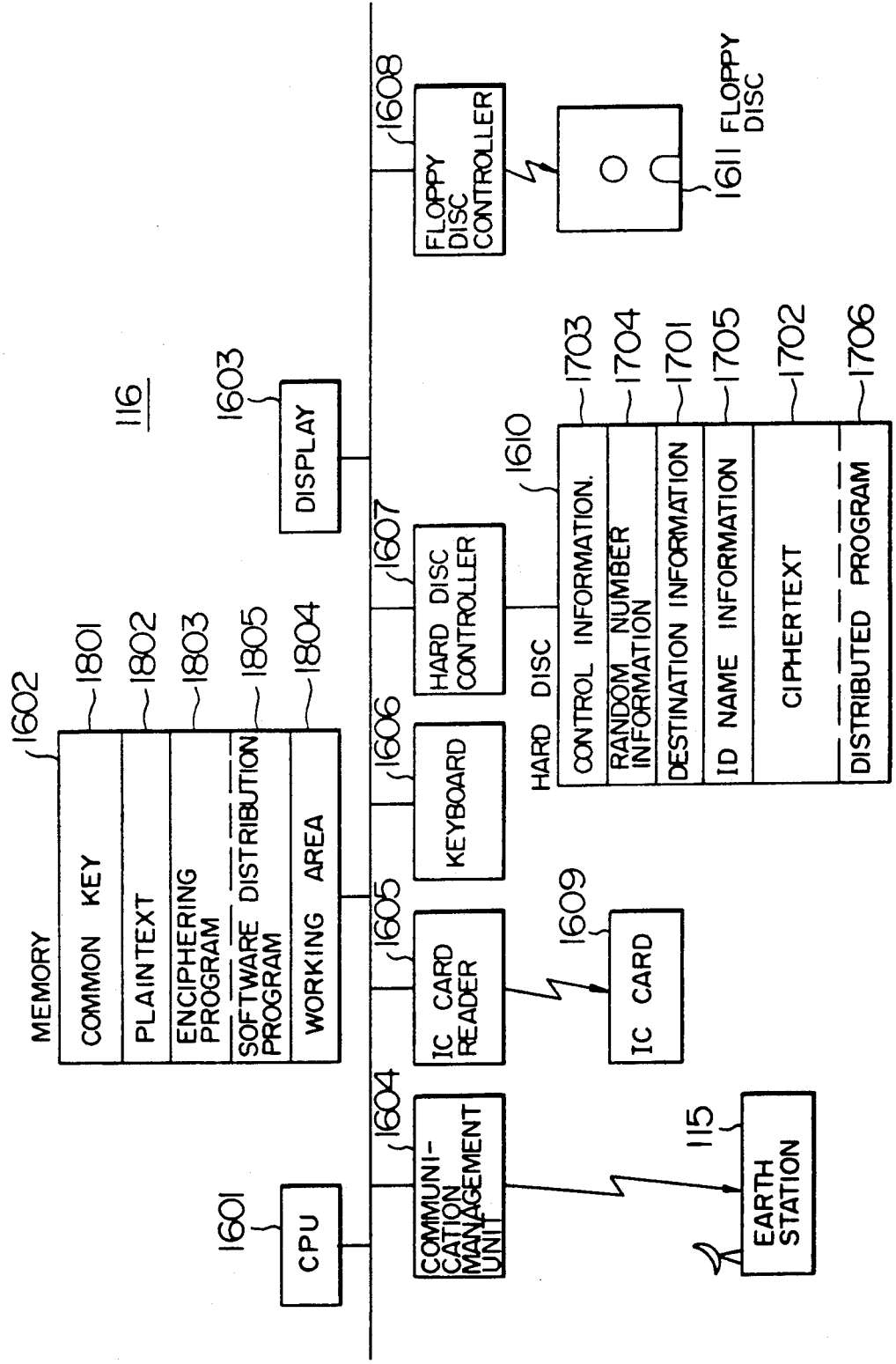

FIG. 9A

CONTROL INFORMATION

| 1 | 1 | 0 | 1 | 0 | ... | ~1703 |

- RANDOM NUMBER INFORMATION
- ID INFORMATION
- ADDITION / DELETION
- CIPHER
- SOFTWARE

FIG. 9B

DESTINATION INFORMATION

| 1 | 1 | 0 | 1 | ... | ~1701 |

FIG. 9C

ID NAME INFORMATION

| D | E | F | L | ... | ~1705 |

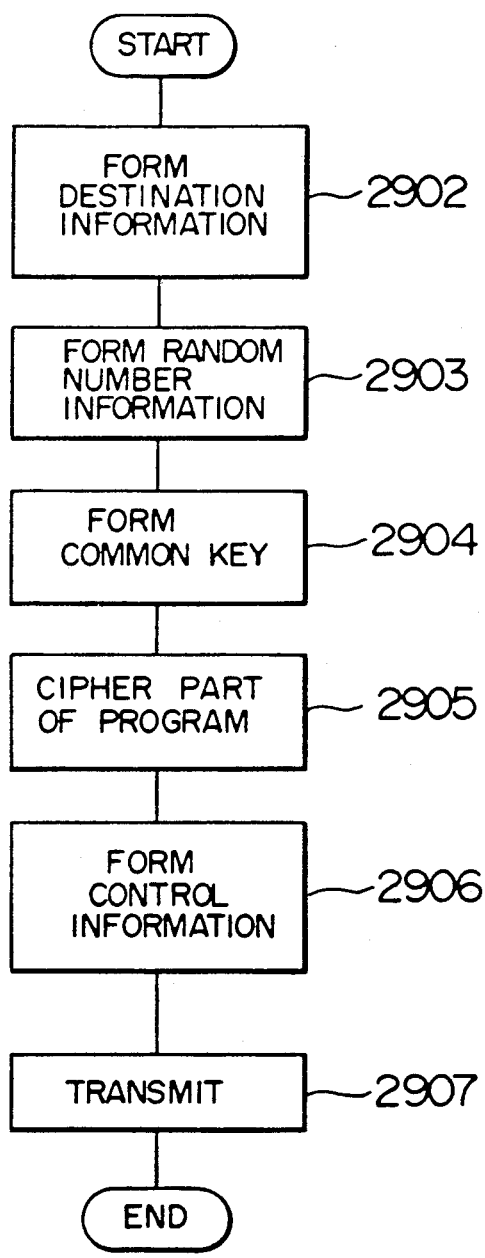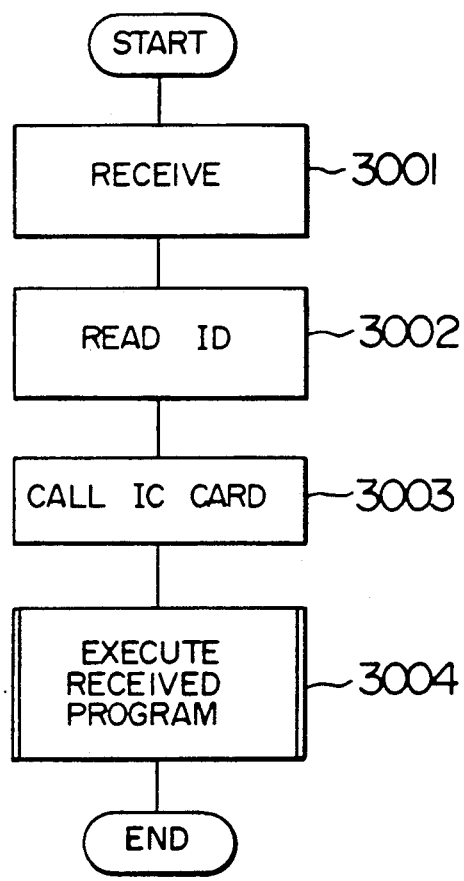

FIG. 21

INFORMATION SERVICE DESTINATION LIST

GROUP 1

| INFOR-MATION \ ID | NO | 1 | 2 | 3 | 4 | ... |
|---|---|---|---|---|---|---|
| | ID | D | E | F | L | ... |
| $A_1$ | | 1 | 1 | 0 | 1 | |
| $A_2$ | | 0 | 1 | 1 | 1 | |
| $B_1$ | | 0 | 1 | 1 | 1 | |
| $B_2$ | | 0 | 0 | 1 | 1 | |
| AI SOFTWARE | | 1 | 1 | 0 | 1 | |

GROUP n

| INFOR-MATION \ ID | NO | 1 | 2 | 3 | 4 | |
|---|---|---|---|---|---|---|
| | ID | G | H | I | L | |
| $A_1$ | | 0 | 0 | 1 | 1 | |
| $A_2$ | | 1 | 1 | 1 | 1 | |
| $B_1$ | | 1 | 0 | 1 | 1 | |
| $B_2$ | | 1 | 1 | 0 | 1 | |
| AI SOFTWARE | | 0 | 0 | 1 | 1 | |

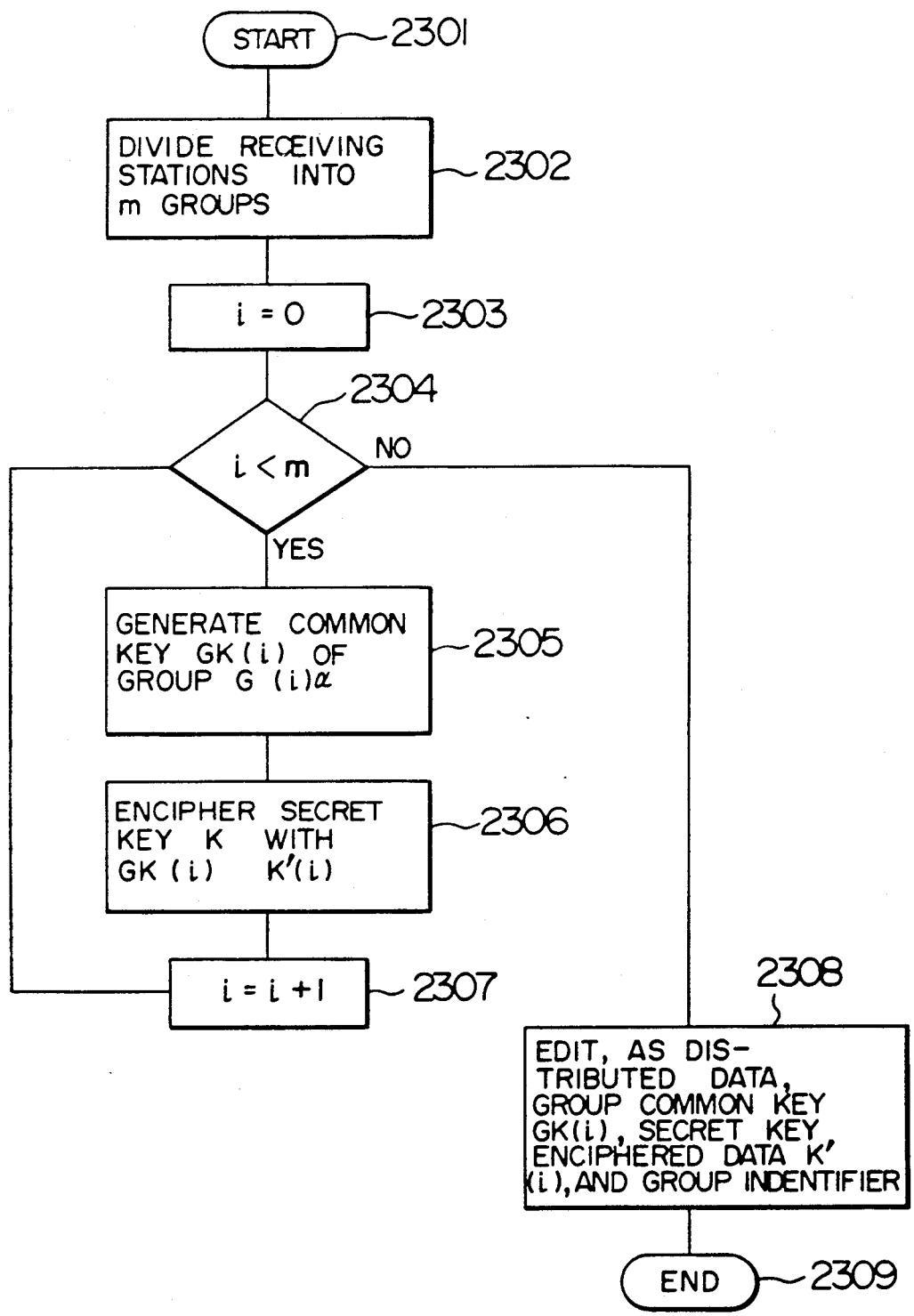

FIG. 26A

| RECEIVING STATION NAME | ID INFORMATION |
|---|---|
| IC1-001 | 900205 Y A S U K |
| IC1-002 | 890907 O K A D A |
| IC1-003 | H · YA 890108 * |
| ⋮ | ⋮ |

FIG. 26B

| RECEIVING STATION NAME | ID INFORMATION |
|---|---|
| IC2-001 | 56F013AB42D381FE |
| IC2-002 | J.G * 62080301 |
| IC2-003 | 1268-123 |
| ⋮ | ⋮ |

SECRET INFORMATION SERVICE SYSTEM AND METHOD

BACKGROUND OF THE INVENTION

The present invention relates to a secret information service system and method, and more particularly to a secret information service system and method wherein an information service station enciphers information to be supplied by using an ID key for information destination subscribers, and a receiving station deciphers the information by using the same ID key.

As societies become overflowing with more and more information, information service is now available through broadcast communications via a satellite, local area network (LAN), cable television network (CATV) and the like. For information communications service, it is important that various information such as movies, news, market information, investment information, and software is required to be supplied correctly and sufficiently to subscribers. It is also important that secret information or highly value-added information should not be leaked to any third parties.

In communications having a broadcast function such as satellite communications, signals transmitted at a physical level reaches basically all receiving stations. In order to regulate information destination stations in broadcast communications, it is effective if cryptographic communications are carried out.

As well known, in cryptographic communications, a transmitter enciphers a plaintext by using an enciphering key, and a receiver receives the ciphertext and deciphers it into the plaintext to obtain the original information. The enciphering key is in one-to-one correspondence with the deciphering key, and only a person possessing the deciphering key can decipher the ciphertext in cryptographic communications. A person not having the deciphering key cannot decipher the ciphertext so that cryptographic communications are not available.

By using such characteristics of cryptographic communications, it becomes possible to regulate information destination stations. Namely, a ciphertext is broadcast after a plurality of limited destination stations only are permitted to have a deciphering key. With such an arrangement, original information is allowed to be accessed only by authorized destination stations. Although physical signals are received by unauthorized stations, they have not a deciphering key so that the original information cannot be accessed. Cryptographic limited broadcast communications are associated with the following problem. In ordinary broadcast communications, there are several to ten thousands receiving stations and a great number of types of information to be supplied.

Different stations desire to receive different types of communications and information. Therefore, an information service station is required to prepare a great number of reception patterns. Each time a different reception pattern is used, a deciphering key at a receiving station must be changed, resulting in a large burden on the information service station.

A conventional technique dealing with such a problem is disclosed as a secret key sharing unit for 1:N uni-directional communications.

FIG. 1 shows the system using the secret key sharing unit according to this disclosed art.

In this known art, 1:N (N≧2) communications are carried out in the following manner. In dual-directional secret communications among three or more receiving stations, each receiving station independently inputs all identification codes ID other than its own identification code ID to an input terminal 2701 of its own secret key sharing unit CR. Assuming that the group members include users A, B, and C. User A inputs identification codes IDB and IDC of users B and C other than its own identification code ID to the input terminal 2701 of the secret key sharing unit CR. Basing on the identification codes IDB and IDC inputted from the input terminal 2701. One way functions F(IDB) and F(IDC) are generated by a one way function F(*) generator 2702 having the structure common to all users. The generated functions are not inputted to a function comparator 2704, but are added by a modulo-2 adder 2709 to a random number R common to all users of network or data communication systems and inputted beforehand in a third memory 2708 and to a one way function F(IDA), thereby obtaining a one way function value ro:

$$ro = R \oplus F(IDA) \oplus F(IDB) \oplus F(IDC)$$

The one way function value ro is inputted to a one way function f(*) generator 2706 having the function common to all users to obtain a secret key $K_{ABC}=f(ro)$ which is outputted from an output terminal 2707. User A is allowed to carry out secret communications by using the secret key $K_{ABC}$ specific only to user A.

Similarly, user B inputs identification codes IDA and IDC of users A and C other than its own identification code ID to an input terminal 2701 of the secret key sharing unit CR. Basing on the identification codes IDA and IDC inputted from the input terminal 2701. One way functions F(IDA) and F(IDC) are generated by a one way function F(*) generator 2702 having the structure common to all users. The generated functions are not inputted to a function comparator 2704, but are added by a modulo-2 adder 2709 to a random number R common to all users of network or data communication systems and inputted beforehand in a third memory 2708 and to a one way function F(IDA), thereby obtaining a one way function value ro:

$$ro = R \oplus F(IDB) \oplus F(IDA) \oplus F(IDC)$$

The one way function value ro is inputted to a one way function f(*) generator 2706 having the structure common to all users to obtain a secret key $K_{ABC}=f(ro)$ which is outputted from an output terminal 2707. User B is allowed to carry out secret communications by using the secret key $K_{ABC}$ specific only to user A.

User C inputs identification codes IDA and IDB of users A and B other than its own identification code ID to an input terminal 2701 of the secret key sharing unit CR. Basing on the identification codes IDA and IDB inputted from the input terminal 2701. One way functions F(IDA) and F(IDB) are generated by a one way function F(*) generator 2702 having the structure common to all users. The generated functions are not inputted to a function comparator 2704, but are added by a modulo-2 adder 2709 to a random number R common to all users of network or data communication systems and inputted beforehand in a third memory 2708 and to a one way function F(IDA), thereby obtaining a one way function value ro:

$$ro = R \oplus F(IDB) \oplus F(IDA) \oplus F(IDC)$$

The one way function value ro is inputted to a one way function f(*)generator 2706 having the structure common to all users to obtain a secret key $K_{ABC}=f(ro)$ which is outputted from an output terminal 2707. User C is allowed to carry out secret communications by using the secret key $K_{ABC}$ specific only to user A.

The detail of this conventional system is described in Japanese Patent Laid-open Publication JP-A-63-280530.

SUMMARY OF THE INVENTION

The above conventional technique has the following two problems. For example, instead of inputting IDB and IDC to the secret key sharing unit, consider the case where user A intentionally inputs IDB, IDC, IDA, and IDD which is an ID for the fourth user. In this case, the calculation results by the adder are:

$$\begin{aligned} r'o &= R \oplus F(IDA) \oplus F(IDB) \oplus F(IDC) \oplus F(IDA) \oplus F(IDD) \\ &= R \oplus F(IDA) \oplus F(IDA) \oplus F(IDB) \oplus F(IDA) \oplus F(IDD) \\ &= R \oplus F(IDB) \oplus F(IDC) \oplus F(IDD) \end{aligned}$$

The calculation of an exclusive logical sum has the same results even if the calculation order of terms is changed, and $F(IDA) \oplus F(IDA)=0$. This r'o is a secret key among users B, C, and D. Therefore, user A can intentionally obtain a secret key among users not including user A. Such a case is also true for all users in the network. Accordingly, in conventional 1:N ($n \geq 2$) communications, a user which is not allowed to perform secret communications can have a secret code by intentionally entering an erroneous combination of IDs, and can receive and decipher a ciphertext.

The above-described conventional technique does not disclose means for notifying N+1 users in 1:N cryptographic communications of whom they are in cryptographic communications with. For example, in the operation by user A, the secret key cannot be obtained unless user A is notified that it carries out cryptographic communications not with users E and F but with B and C. According to the known technique, a suer is required to input the ID information to the input terminal 2701 to notify associated users of cryptographic communications. Accordingly, if the system has a large N (e.g., N=10,000), it is necessary to transmit beforehand a data as long as N×ID, resulting in a large burden on the system.

It is a first object of this invention to provide a secret broadcast communication system among a plurality of users capable of preventing illegal tapping by third parties. It is a second object of the present invention to provide a broadcast communication system among a limited number of users capable of reducing a burden on the whole system by enciphering and deciphering information by using a cryptographic key common to a transmitter and receivers.

In order to achieve the first embodiment, in the information service system of this invention, each receiving station and an information service station store beforehand a set of information destinations represented by subscriber identifiers (ID) of the information service system, the information service station generates an enciphering key by using the information destination set to encipher and transmit information. Each receiving station receives the information from the information service station, generates a deciphering key from the information destination set to decipher the received information. In this case, each receiving station stores its own subscriber identifier within it or within a removable circuit unit (e.g., IC card). Only if the information destination set includes the own subscriber identifier, the enciphering key is allowed to be generated by the circuit unit, and if not, it is inhibited.

If the subscriber identifier for each user is stored in a removable circuit unit (e.g., IC card), generating a deciphering key is carried out within the removable circuit unit.

In order to achieve the second object, in the information service system of this invention, each receiving station and an information service station store a set of all subscriber identifier information of all subscriber identifiers (ID) disposed in a predetermined order. The information service station has a table for storing destination information codes representative of information destinations for each type of information, in accordance with the all subscriber identifier information set. An enciphering key is generated from the identifier information set of destination subscribers, and the information is enciphered. The enciphered information is added with the destination information codes and is broadcast. Each receiving station reads the identifier information set of destinations from the destination information codes while referring to the all subscriber identifier information set. The receiving station then generates a deciphering key form the readout identifier information set. In this case, each receiving station stores beforehand its own subscriber identifier within the receiving station or within a removable circuit unit (e.g., IC card), and if the own subscriber identifier is not included within the identifier information set, generating the deciphering key is inhibited.

In this case also, if the subscriber identifier for each user is stored in a removable circuit unit (e.g., IC card), generating a deciphering key is carried out within the removable circuit unit. This circuit unit is constructed of software which inhibits to read programs stored therein or change the subscriber identifier stored therein. For example, when the destination information set or identifier information set is given as input data, it is checked if there is the same identifier as the own subscriber identifier stored therein. Only when there is the same identifier, a has total of the destination information set or identifier information set is calculated to output the results as a deciphering key.

If information to be supplied is software such as programs, the programs made at a service station is required to be prevented from being copied at a receiving station. To this end, the information service station generates an enciphering key from a subscriber identifier set of destination subscriber identifiers, and enciphers the programs to then provide the subscriber identifier set and enciphered programs. At a receiving station, if the subscriber identifier stored in the IC card is contained within the subscriber identifier set, first processes are executed within the IC card wherein a deciphering key is generated from the subscriber identifier set to decipher the ciphered programs. Second processes are executed at the receiving station terminal equipment wherein when the deciphered programs are supplied from the IC card, they are saved in a first memory and written in a second memory to execute them, and thereafter the deciphered programs are changed to the original enciphering programs to terminate the program execution.

According to the present invention, the information to be supplied is enciphered by using the destination information set represented by destination subscriber identifiers (ID). At a receiving station, a deciphering key is generated from the destination information set to decipher the received information. In this case, each receiving station stores its own subscriber identifier within it or within a removable circuit unit (e.g., IC card). If the subscriber identifier is not contained within the destination information set, generating a deciphering key is inhibited to thereby prevent illegal tapping by third parties.

Each receiving station and an information service station store all subscriber identifier information set having all subscriber identifiers (ID) disposed in a predetermined order. The information service station transmits the enciphered information by adding thereto destination information codes, for each type of information, representative of destination subscribers and corresponding to the all subscriber identifier information set. Accordingly, the information amount necessary for designating information destinations corresponds to all subscribers × 1 bits, thereby reducing the burden on the whole system.

In the above-described method of distributing a limited broadcast cryptographic key, data for generating a secret key common to N terminal equipments is distributed from an information service center to N terminal equipments. In accordance with the received secret key generating data, a secret key is generated at each receiving station in accordance with open ID information. The term "open ID information" is the information of all subscriber stations of the system. If the number of subscriber stations becomes infinitely large, the corresponding secret key generating ID information becomes infinitely large and hence the secret key generating time becomes infinitely long, thereby increasing the burden on the whole system.

In order to solve the above object, prior to the start of information service, receiving stations are divided into m groups G(i). Each group receives as its input data optional n ID information to calculate a hash total of all ID information of the group, and the hash total is used as the common key to the group. A secret key is ciphered by using the common key of the group to thereby obtain a cipher secret key and distribute it.

With such an arrangement, in a 1:N secret communication system for a plurality of receiving stations, even if the number of receiving stations becomes infinitely large, only the IDs of receiving stations at information destinations are used for generating a group common key and hence a secret key. The time required for generating a common key is therefore dependent not upon the total number of receiving stations of the system but upon the number of receiving stations in each group, thereby avoiding a considerably long time and too large a burden on the whole system.

Furthermore, an increase of N can be readily dealt with even during operation of the system by correspondingly increasing the number of logical groups and the burden on the information service center.

BRIEF DESCRIPTION OF THE DRAWINGS

FIG. 2 shows the system arrangement of this invention;

FIG. 4 shows the structure of the information service unit shown in FIG. 2;

FIGS. 6A and 6B show the detailed structure of the satellite communication information service destination list and LAN information service destination list, respectively stored in the file shown in FIG. 4;

FIG. 7 is a flow chart showing the processes executed by the information supply program 1403 shown in FIG. 3;

FIG. 8 shows the detailed structure of a receiving station of the system shown in FIG. 2;

FIGS. 9A, 9B, and 9C show the detailed structure of control information, supply information, and ID information within the hard disc at a receiving station terminal equipment;

FIG. 10 is a flow chart illustrating the information deciphering program 1803;

FIG. 16 is a flow chart of the processes executed by the software distribution program shown in FIG. 4;

FIG. 17 is a flow chart of the processes executed by the software distribution program shown in FIG. 8;

FIG. 21 shows an information service destination list table used with the information service system shown in FIG. 20;

FIG. 23 is a detailed flow chart of the secret key K distribution data generating process at step 2204 in the flow chart shown in FIG. 22;

FIGS. 26A and 26B show examples of the ID information practically used in the information service system.

DESCRIPTION OF THE PREFERRED EMBODIMENTS

Figure 1:
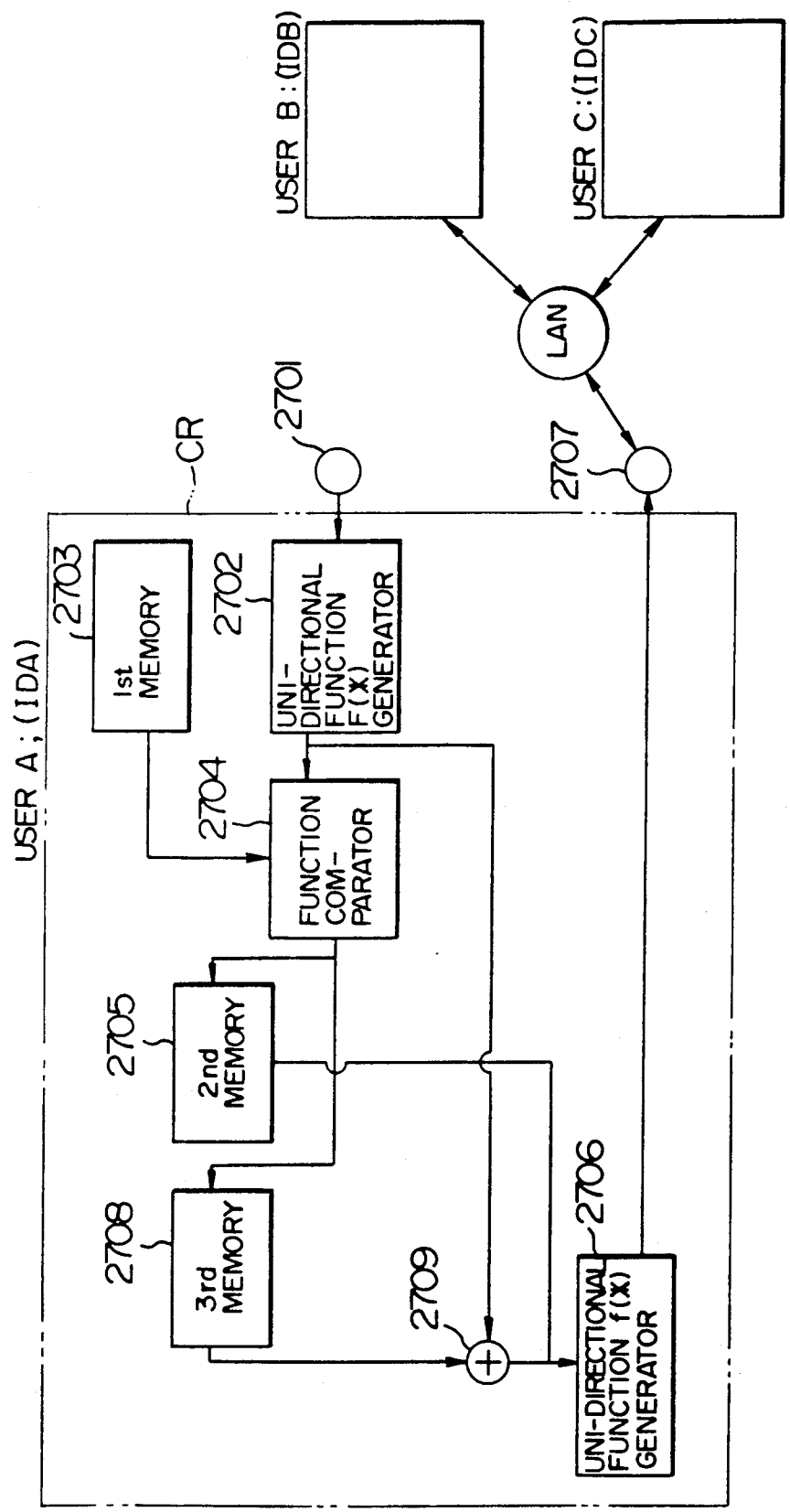
FIG. 1 is a block diagram showing the structure of a conventional secret information service system.

FIG. 2 shows a system arrangement of a secret information service system according to an embodiment of this invention.

The secret information service system shown in FIG. 2 is mainly constructed of an information supplier group 101, information service facilities 102, and information user groups 103 and 104.

In the information supplier group 101, an information supply unit 106 transmits image information and the like taken with a camera 105 to an information service unit 111. Information supply groups 108 and 109 transmit obtained information and the like via a communication network 110 to the information service unit 111.

In the information service facilities 102, the information service unit 111 stores the received information in a file 112, arranges, edits and transmits it to earth stations 115 and 117 and a vehicle earth station 119 via an earth station 113 and communication satellite 114, or to receiving stations 122, 123 and 124 via a local area network 121. Information transmitted to the earth stations 115, 117 and 119 is then transmitted to receiving stations 116, 118, and 120, respectively.

Figure 3B:
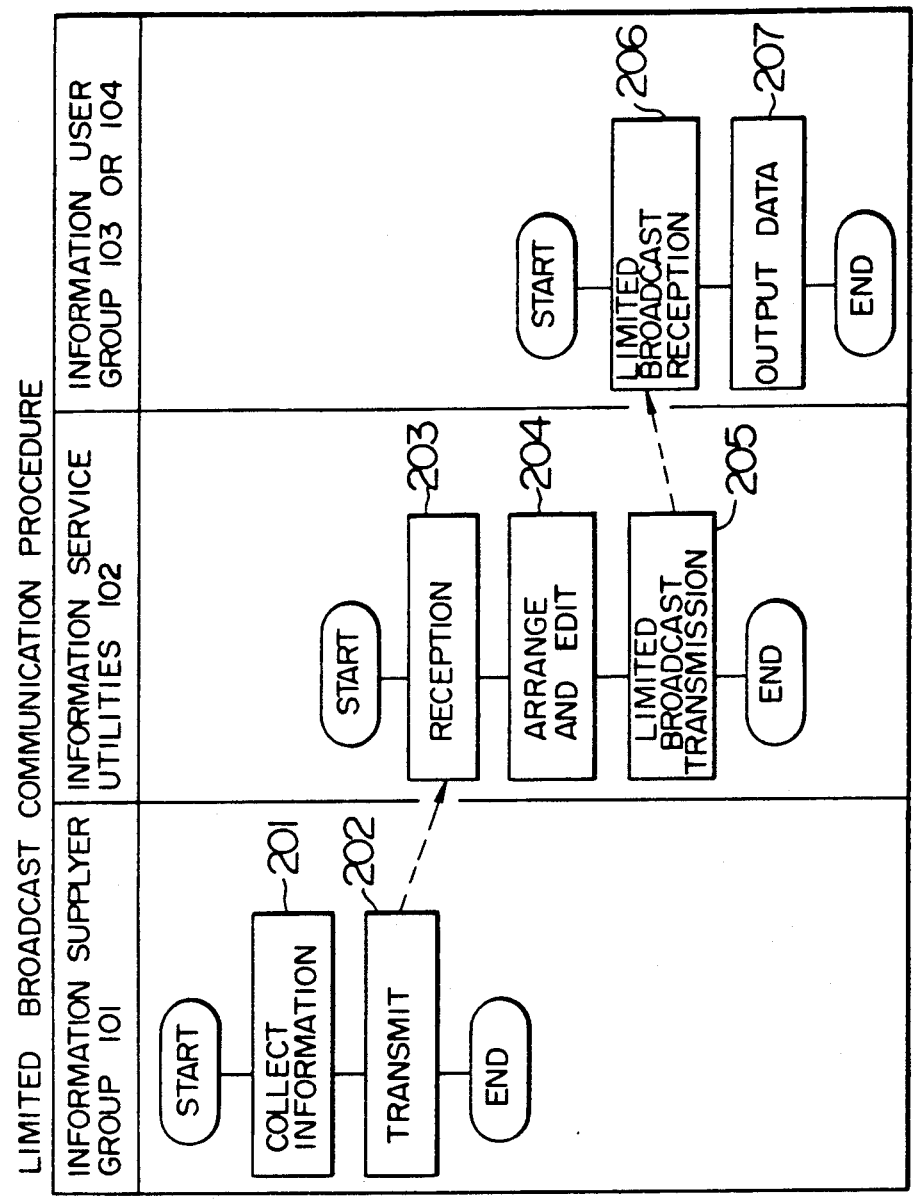
FIGS. 3A and 3B are flow charts illustrating the system initialization and following service information control of the embodiment shown in FIG. 2.

FIG. 3B shows the outline of information processing while information flows from the information supplier group 101 to the information service facilities 102 and to the information use group 103 or 104. The information supplier group 101 collects information (201), and transmits it to the information service facilities 102 (202). The information service facilities (102) receive information (203), arrange, edit (204), and transmit it to the information user group 103 or 104 (205). The information user group 103 or 104 receives information (206) and outputs the received data (207).

For the limited broadcast transmission 205 and limited broadcast reception 206, cryptographic communications control is carried out under ID base key management for 1:N communication. With the cryptographic communications scheme under ID base key management, a transmitter (information service facilities 102) selects desired N receivers (receivers belonging to the information user group 103 or 104) to carry out 1:N communication, a cryptographic key common to both the transmitter and receivers is generated in accordance with an ID number assigned to the transmitter and ID numbers assigned to the receivers, and messages are enciphered or deciphered using the cryptographic key.

Specifically, a system manager (a manager for the information service facilities 102) stores ID information assigned to particular subscribers using receiving stations in an internal memory in a predetermined order, and informs all receiving stations of the ID information. Similarly, each receiving station stores a plurality of informed ID information in a memory of a terminal equipment in the same order. Each receiving station designates desired information and asks the system manager to supply the information.

Upon request from a subscriber at each receiving station, the system manager broadcasts various information. In this case, the information to be supplied is enciphered by using a cryptographic key generated by the ID information of all information receiving stations, and the obtained ciphertext is added with receiving station information composed of a plurality of bits. Each bit of the receiving station information corresponds to the ID information of each receiving station stored in the memory of the service facilities or each receiving station terminal equipment. Each receiving station terminal equipment can read its own ID information from the receiving station ID information.

At each receiving station terminal equipment if the receiving station ID information contains its own ID information, the received ciphertext can be deciphered by using the cryptographic key (in this case, deciphering key) generated from the receiving station ID information.

According to this invention, the process of judging if the receiving station information inputted from the information service facilities 102 contains its own ID information and the process of generating a cryptographic key, are executed within an IC card. The supplied information can be deciphered into original messages only by a receiving station to which a subscriber authorized by the system manager belongs and whose ID information is contained in the receiving station information.

The above embodiment will be further detailed. FIG. 4 shows the detailed structure of the information service unit 111.

The information service unit 111 is constructed of a keyboard 1211, CPU 1201, timer 1202, semiconductor memory 1203 such as RAM, display 1210, respectively connected to a common bus, a file 112 made of a hard disc connected via a hard disc controller 1207 to the common bus, receiving antenna 1212 connected via a communication management unit 1204 to the common bus, communication management unit 1205 connected to the common bus and to communication networks 121 and 110, earth station 113 connected via a communication management unit 1206 to the common bus.

The file 112 stores satellite communication information service destination list 1301 and LAN information service destination list 1302 which are supplied from the information user group 103 and 104 at the initialization stage.

As shown in FIG. 6A, in the satellite communication information service destination list 1301, the type of information is indicated along the ordinate and the ID number of each information receiving station is indicated along the abscissa. The ID numbers D, E, F, and L are assigned to the receiving stations 116, 118, and 120, and the information service unit 111, respectively. A bit "1" at each intersection indicates that information is allowed to be supplied, and a bit "0" indicates that information is not allowed to be supplied. The LAN information service destination list 1302 has a similar structure (refer to FIG. 6B). The ID numbers G, H, and I are assigned to the receiving stations 122, 123, and 124, respectively.

Figure 3A:
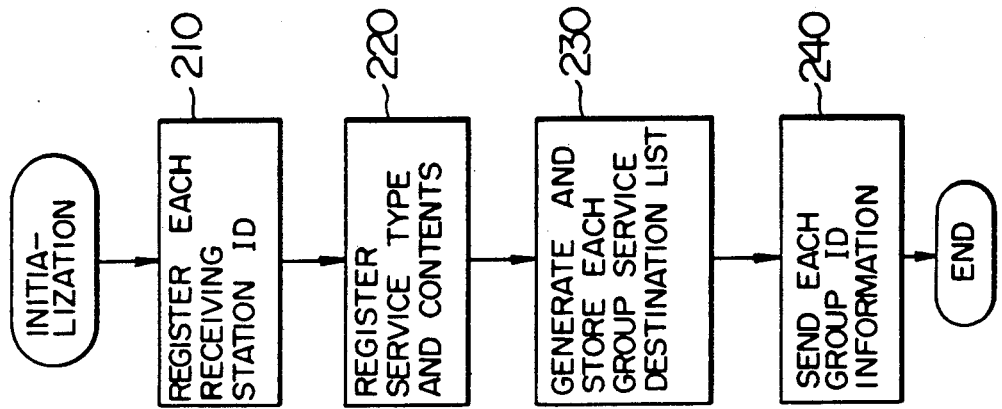

The ID numbers D, E, F, G, H, I, and L assigned to the receiving stations and information service unit, and the satellite communication information service destination list 1301 and LAN information service destination list 1302 shown in FIGS. 6A and 6B, are generated at the time of initialization of the secret information service system as shown in the flow chart of FIG. 3A.

Specifically, by using the keyboard 1211 and display 1210 mounted on the information service unit 111 of the information service facilities 102, the ID numbers D, E, F, G, H, I, and L are first assigned to the receiving stations 116, 118, 120, 122, 123, and 124 and the information service unit 111, respectively (step 210). In this embodiment, the broadcast communication groups include the information user group 104 using a LAN, and the information user group 103 using a communication satellite. Within each group 103 or 104, each receiving station registers the types and items of serviceable information (step 220). In accordance with entered information, the information service unit 111 arranges and edits receiving station IDs and service items to generate the satellite communication information service destination list 1301 and LAN information service destination list 1302 and store them in the file 112 (step 230). Thereafter, each receiving station of each information user group sends ID information of receiving stations under broadcast communications, to then terminate the initialization of the system (step 240). The information A1, A2, and A3 indicated at 1303, 1304, and 1305, and corresponding software 1307, 1308, and 1309 respectively stored in the file 112 of the information service unit 111 may be set at the time of initialization or may be supplied from the information supplier group 101 and further supplied to receiving stations in accordance with the service destination lists 1301 and 1302.

Stored in the file 112 are information A1 1303, A2 1304, B1 1305 received as serviceable information from the information supplier group 101, and other information.

A memory 1203 stores information supply programs 1403 which run under control of CPU 1201.

FIG. 7 is a flow chart illustrating the information supply program 1403.

At step 1502, referring to the satellite communication information service destination list 1301 or LAN information service destination list 1302 stored in the file, a bit train (e.g., "1" || "1" || "0" || "1"...) corresponding to the supply information (e.g., information A1) is read as destination information 1401 and stored in the memory 1203.

At step 1503 a random number (R) of eight bits is generated under control of CPU and stored in the memory 1203 as random number information 1406. The information 1401 and 1203 is used in generating an enciphering key for enciphering information to be supplied, and is transmitted to each receiving station for generating a deciphering key.

At step 1504 each receiving station ID of one bit is read from the destination information 1401 in the memory 1203, a hash total is calculated for the ID and random number information 1406, and the calculated results are stored in the memory 1203 as the destination information 1401. For example, the ID numbers of bits of the destination information 1401 of the information A1 are L, D and E respectively of the information service unit 111 and receiving stations 116 and 118. Therefore, the common key K is given by the following equation:

$$K_{DEL} \leftarrow h(Io, "R" || "D" || "E" || "L")$$

This $K_{DEL}$ (having an initial value Io) is an enciphering key (deciphering key) shared only between the information service unit 111 and receiving stations 116 and 118, as will be described later.

Next, by using the common key $K_{DEL}$ 1404, the information A1 1303 in the file 112 is enciphered (step 1505). The ciphertext can be expressed as follows:

$$C_{DEL} \leftarrow En(K_{DEL}, A1)$$

The details of the calculation functions h and Enc are described, for example, in "Multi-media Encryption Algorithm" by Takaragi et al, SIGDPS-40-5, Information Processing Society of Japan (1989).

The ciphertext $C_{DEL}$ is written in the memory 1203 at a ciphertext area 1402 (step 1505).

Figure 5A:
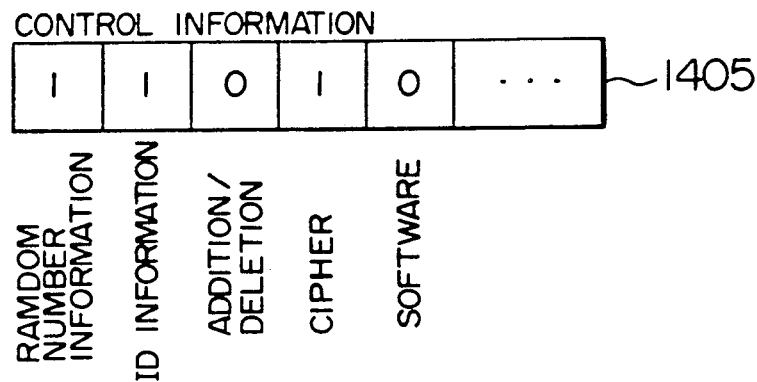
FIGS. 5A, 5B, and 5C are the detailed structure of the control information and destination information stored in the memory shown in FIG. 4.
Figure 5B:
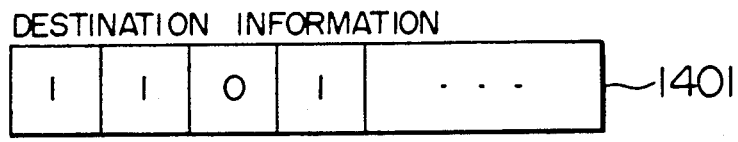

In generating the common key $K_{DEL}$, there are used as input data for a hash total the random number information 1406 (R) and the ID information (D, E, L) of the destination information 1401. In order for the other receiving stations to be recognizable of the state of this input data, there is generated control information such as shown in FIG. 5A (step 1506). Specifically, at the first bit of the control information 1405 a bit "1" is set indicating that random information was used, and at the second bit a bit "1" is set indicating that ID information of the destination information 1401 was used. The third bit of the control information indicates if there is ID information which is to be added to or was deleted from the ID information used as input data for generating a hash total. The detail of this will be later given. In this example, a bit "0" is set indicating that there is no information which is to be added or was deleted. In this case, no data is written in the memory 1203 at an addition/deletion ID information area 1407. At the fourth bit of the control information 1405, a bit "1" is set indicating that cryptographic communications are carried out. At the fifth bit of the control information 1405, a bit "0" is set indicating that information to be transmitted is not software information.

Next, the control information 1405, random number information 1406, destination information 1401 and ciphertext 1402 are transmitted via the communication management unit 1206 and earth station 113 (step 1507).

Other information A2, B1... is processed in the same manner.

The amount of information required by the information service unit 111 for generating destination information per one receiving station is the total number of broadcast communication subscribers × 1 bits. Assuming that there are ten thousands subscribers, the information amount is 10000 bits at maximum. In general TDM broadcast communications using a TDM frame with a destination address, the information amount for address designation is the number of broadcast communication subscribers multiplied by the bit number of each subscriber ID (generally, the length of ID is one or two digits in binary notation). As a result, the embodiment can reduce the information amount by one or two digits.

FIG. 8 shows the detailed structure of the receiving stations 116, 118, 120, 122, 123, and 124 each having the same structure. Each receiving station is constructed of a CPU 1601, semiconductor memory 1602 such as RAM, display 1603, respectively connected to a common bus, earth station 115 connected via a communication management unit 1604 to the common bus, IC card 1609 connectable via IC card reader to the common bus, keyboard 1606, hard disc 1610 connected via hard disc controller 1607 to the common bus, and floppy disc 1611 connected via a floppy disc controller 1608 to the common bus.

As shown in FIG. 9C, in an ID information area 1705 of the hard disc 1610, there is stored the ID information (D, E, F, L, ...) same as the information stored along the abscissa of the information service destination list 1301 of the information service unit 111 set at the time of initialization. The information such as ciphertext and the like transmitted from the information service unit 111 via the communication management unit 1604 is stored in the hard disc 1610 at a predetermined storage area. The memory 1602 stores deciphering programs 1803 which run under control of CPU 1601. While executing this program, data is inputted to or outputted from the IC card via the IC card reader 1609.

The flow chart of the deciphering program 1803 is shown in FIG. 10.

The information sent from the information service unit 111, i.e., the control information 1405, random number information 1406, destination information 1401, and ciphertext 1402 is transferred to the hard disk 1610 via the earth station 115 (117, or 119), communication management unit 1604, and hard disc controller 1607. The transferred control information 1703, random number information 104, destination information 1701, and ciphertext 1702 are stored in the hard disk 1610 at predetermined storage areas (step 1901).

The control information 1703 is then read. After confirming that a bit "1" is being set at the first bit of the control information, the random information (R) 1704 is read and stored in a working area 1804. After confirming that a bit "1" is being set at the second bit of the control information 1703, associated ID information (e.g., D, E, L) are read and stored in the working area 1804 while referring to the destination information 1701 and ID information 1705 (step 1902). Next, an Ic card call subroutine is activated, and the ID information D, E, and L and random number R stored in the working area 1804 are transferred via the IC card reader 1605 to the IC card 1609 (step 1903).

On the side of the IC card, after confirming that its own ID "D" is contained in the ID information, a hash total (using Io as an initial value) is calculated by using the inputted data:

$$K_{DEL} = h (Io, "R", "D", "E", "L")$$

The initial value Io common to the broadcast group is a secret number present only within the information service unit 111 and the IC card at each receiving station, and is not made open to public.

$K_{DEL}$ is written in the memory 1602 at a common key area 1801 via the IC card reader 1605.

Next, the ciphertext 1702 stored in the hard disc 1610 is deciphered by using the common key 1801 (step 1904). Namely, $$A1 \leftarrow Dec (K_{DEL}, C_{DEL})$$

A1 is written in the memory 1602 at a plaintext area 1802 (step 1904).

Next the information A1 written in the plaintext area 1802 is displayed on the display 1603 (step 1905).

Upon entering a command from the keyboard 1606, the data displayed on the display 1603 is written in the floppy disc 1611 via the floppy disc controller 1608 (step[ 1604).

Figure 11:
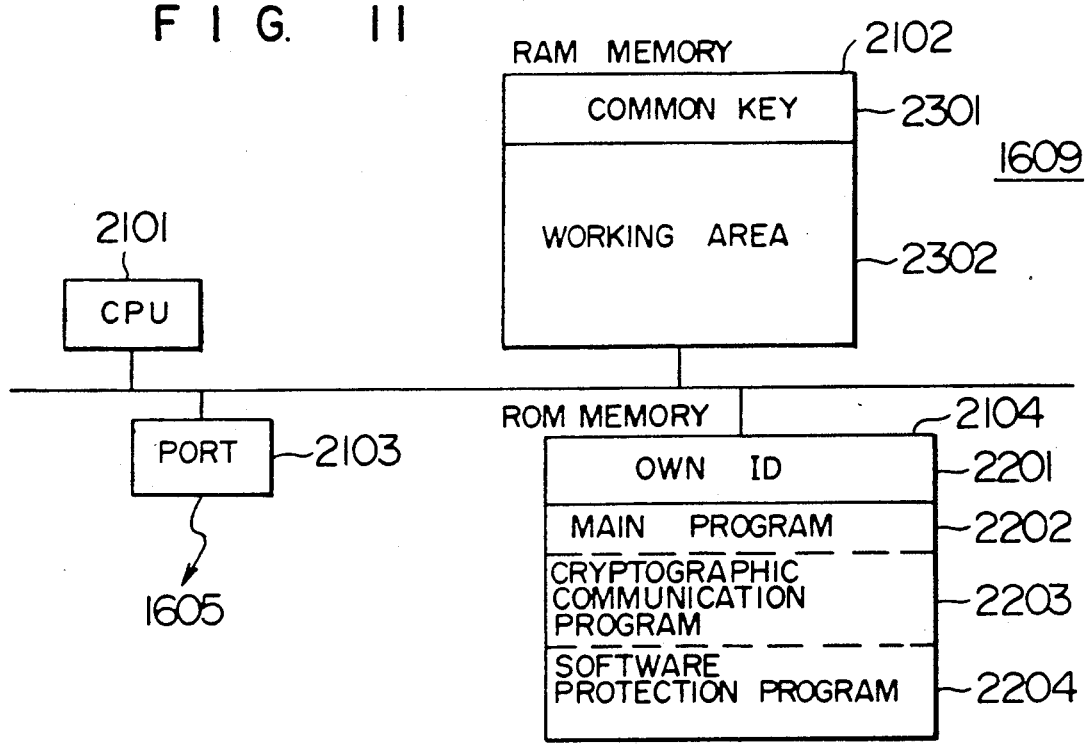
FIG. 11 shows the detailed structure of an IC card at a receiving station.

FIG. 11 shows the detailed structure of the IC card 1609 used by the receiving station 116.

IC card programs 2202 to 2204 stored in a ROM memory 2104 are sequentially executed under control of CPU 2101.

Data input/output relative to the IC card 1609 is performed via a port 2103.

At step 1903 an IC card call sub-routine is activated so that the IC card performs the following processes.

Figure 12:
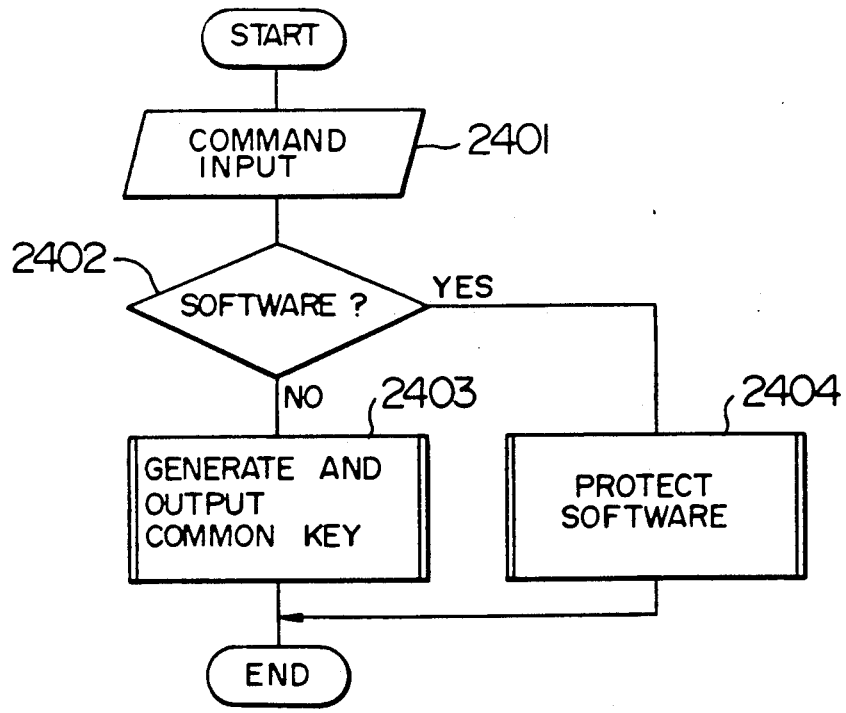
FIG. 12 is a flow chart showing the processes executed by IC card programs 2202 to 2204 for an IC card shown in FIG. 11.

The overall flow of the IC card programs 2202 to 2204 is shown in FIG. 12.

At step 2401, a command such as an activation command for a program within the IC card, or the fifth bit of the control information, is written in the working area 2302 of the RAM memory 2102.

At step 2402, if the command is a command designating an identifier "software" or a bit "1", the control advances to step 2404. If not, the control advances to step 2403.

At step 2403, a process of generating the common key $K_{DEL}$ is performed to thereafter terminate the control.

Figure 18:
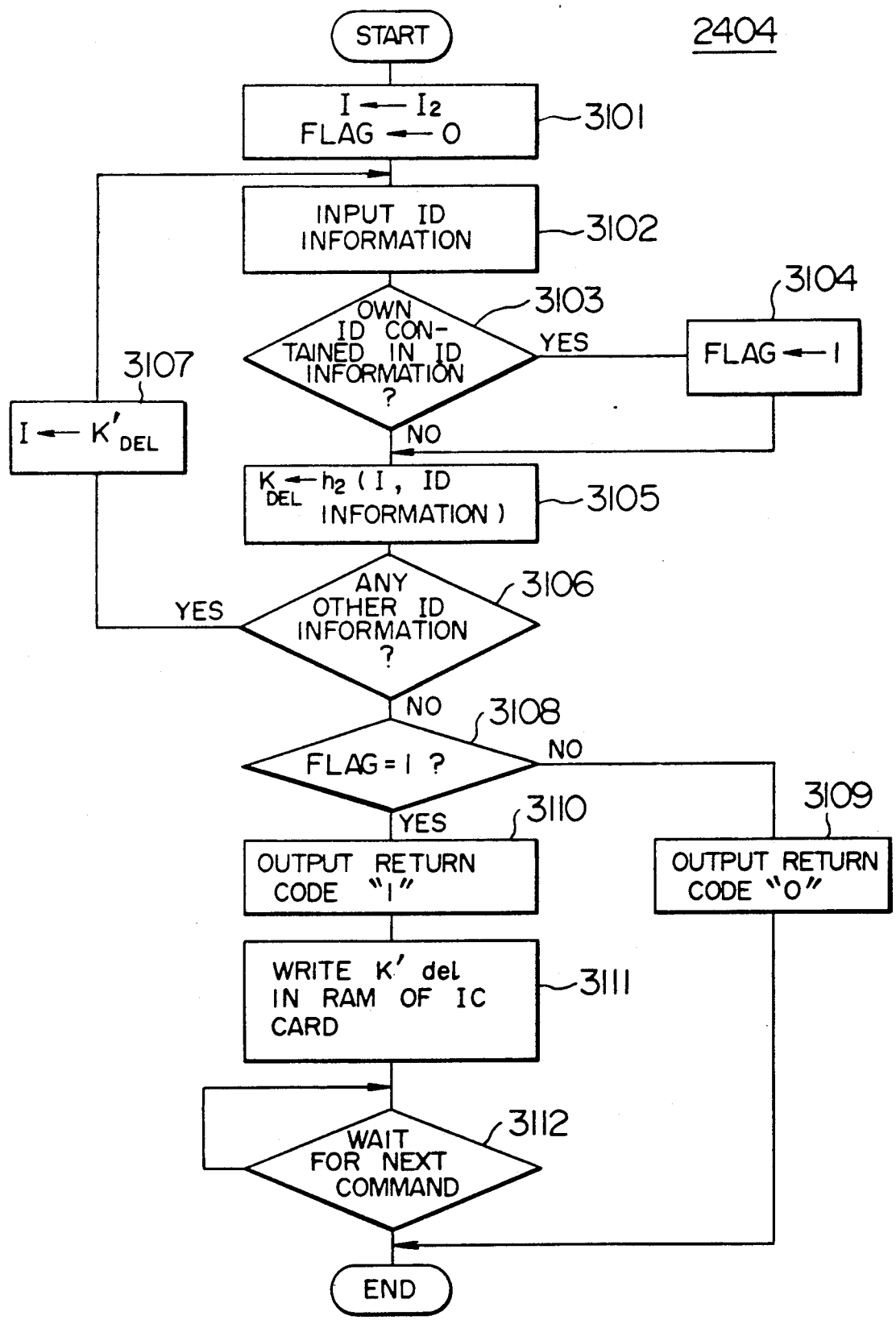
FIG. 18 is a flow chart of the processes executed by the software protection program shown in FIG. 11.

At step 2404, a process of software protection to be described with FIG. 18 is performed to thereafter terminate the control.

Figure 13:
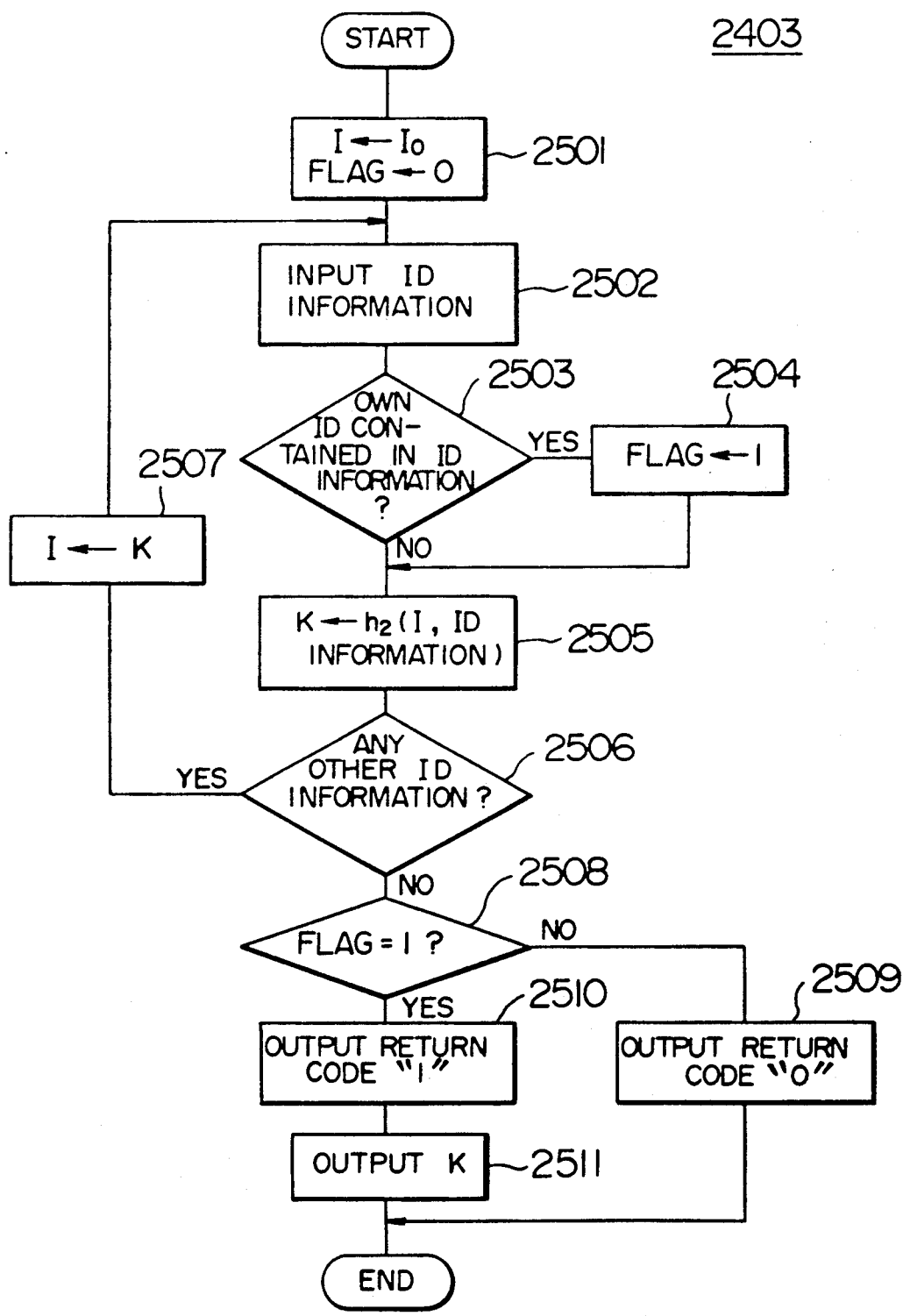
FIG. 13 is a detailed flow chart of the common key generating step 2403 in the flow chart of FIG. 12.

FIG. 13 is a flow chart showing the common key generating step 2403 of the processes executed by the IC card shown in FIG. 11.

At step 2501, the initial value I of the hash function is set to a variable I and the flag variable FLAG is set to 0.

At step 2502 there are supplied via the port 2103 the random number information and ID information obtained from the destination information. In the above example, "R", "D", "E", and ":" are supplied.

At step 2503 it is checked if the entered ID information contains the own ID 2201. If contained, the control advances to step 2504. If not, the control advances to step 2505.

In the above example, the entered ID information contains the own ID "D" so that the control advances to step 2504.

At step 2504, a bit "1" is set to the flag, i.e., FLAG 1.

At step 2505, using I as a hash function initial value, a hash total of the entered ID information is generated. Namely, K←h (I, ID information).

In the above example K←h (I, "R" || "D" || "E" || "L").

At step 2506 it is checked if there is any other ID information to be entered from the port 2103. If there is any other ID information, the control advances to step 2507. If not, the control advances to step 2508.

At step 2507, the initial value is changed. Namely, I←K. Then the control returns to step 2502.

At step 2508 it is checked if the own ID has been processed or not. Namely, it is checked if FLAG=1 or not. If "NO", the control advances to step 2509. If "YES", the control advances to step 2510.

At step 2509, a return code "0" is outputted from the port 2103 to thereby terminate the control.

At step 2510, a return code "1" is outputted from the port 2103.

At step 2511, a calculated result K of a hash total is outputted from the port 2103.

In the above example, $K_{DEL}$ =h (Io, "R" || "D" || "E" || "L") is outputted to terminate the control. The similar control is executed at the receiving station 118 to output $K_{DEL}$.

At the receiving station 120, a different control is executed. Specifically, the IC card of the receiving station 120 is written with its own ID "F", and the entered ID information does not contain the ID "F". As a result, FLAG=0 at step 2508 and step 2511 is not executed and so $K_{DEL}$ is not outputted.

According to this invention, each receiving station has its own ID card (containing the ID information "D" for example), and a common key can be generated from destination information of a plurality of receiving stations including the receiving station in concern. but not from destination information of a plurality of receiving stations not including the receiving station in concern. Therefore, information tapping and fraud by third parties can be prevented.

The program information transmission service of this system will be described below.

As the objects of information service, there are not only documents and image data but also various software programs such as image display programs. Different from document data, such programs are required to be protected from illegal copies by third parties.

Algorithm for protection becomes complicated more and more as the technique for releasing the protection becomes complicated. Therefore, if highly sophisticated protection is given to programs to be supplied, it becomes necessary to implement complicated protection programs. Such protection programs required for newly developed software programs pose a problem of large cost and labor.

As another embodiment of this invention, there will be described a software distribution management system capable of preventing illegal copies of supplied software programs, without using complicated protection programs.

Figure 14:
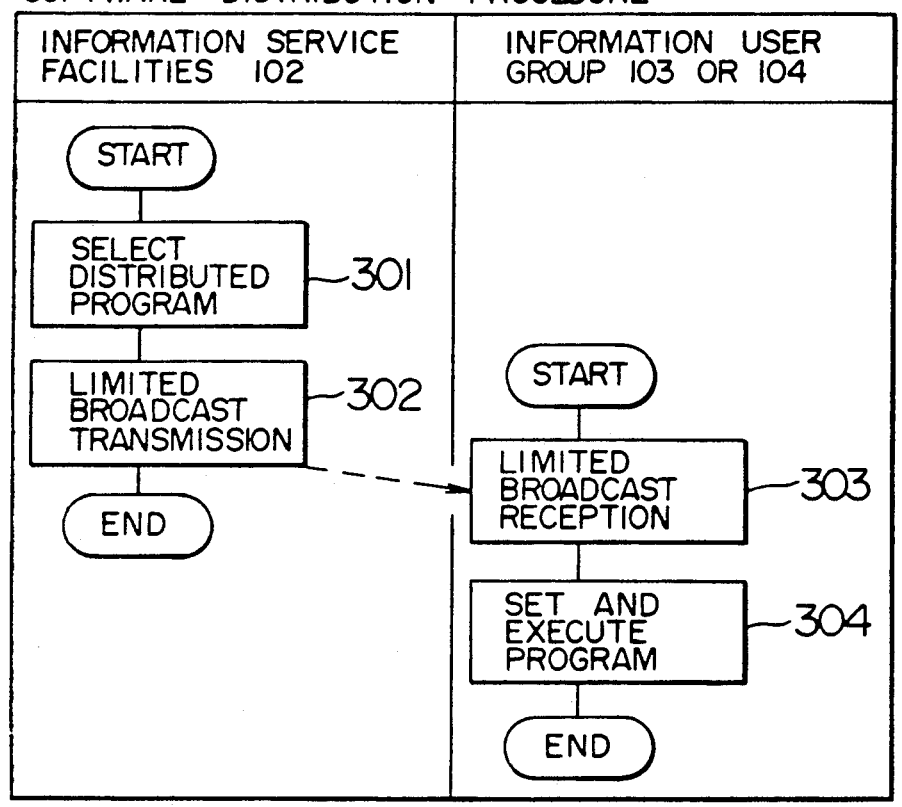
FIG. 14 shows the outline of the process when software information to be executed at each receiving station is distributed within the system shown in FIG. 2.

FIG. 14 shows the outline of the process of distributing software information to be used at each receiving station, from the information service facilities 102 to the information user group 103 or 104. The types of software to be distributed include, for example, image display software used for receiving information supply service at a receiving station, menu image display software of a new version dealing with an increase of the types of information service.

The information service facilities 102 select from the file 112 a program to be distributed (step 301), and send it to the information user group 103 or 104 (step 302). The information user group 103 or 104 receives the software (step 303), sets it to CPU and executes it (step 304).

A program to be distributed is provided with a function of an IC card cipher trap routine so as not to be used illegally. In other words, the program selected by the transmitter at step 301 is enciphered in part so that the program cannot run ordinarily unless the ciphered part is deciphered. The information transmitted by the transmitter at step 302 includes not only the program information but also the above-described control information, and the like, so that the deciphering key can be generated only by the IC cards possessed by N receivers authorized by the transmitter. When the receiver receives the program, control information and the like, the IC card generates the key from the entered control information and the like and holds it. If the enciphered part of the program is inputted to the IC card while executing the program, the enciphered part is deciphered by the key and the deciphered program is returned to the receiving station terminal equipment to further execute the program (step 304). Even if the receiving party copies the transmitted program and gives it third parties, the program cannot run normally unless there is an IC card which deciphers the enciphered part of the program under execution. In this manner, illegal copies of a program can be prevented.

The above embodiment will further be described in detail. The structure of the information service unit 111 is the same as shown in FIG. 4, and the structure of the receiving station 116 and IC card 1609 is the same as shown in FIGS. 8 and 11, respectively. The A1 software 1307 at the information service unit 111 includes image display software for analyzing and displaying the information A1 received at a receiving station.

Figure 15:
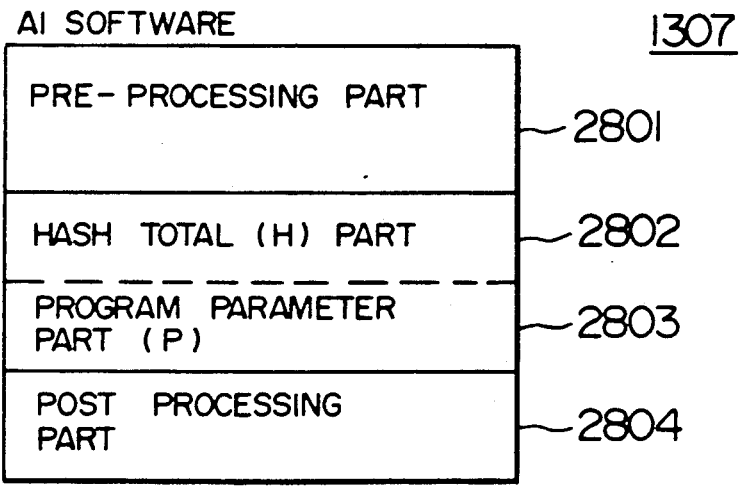
FIG. 15 shows the detailed structure of the A1 software shown in FIG. 4.

The detailed structure of the A1 software is shown in FIG. 15. The A1 software is composed of a preprocessing part 2801, hash total part 1802, program parameter part 2803, and post-processing part 2804. A hash total $H = h(I_2, program)$ for a predetermined area (within the program) of the A1 software is written in the hash total part 2802. The initial value $I_1$ is different from the initial value Io, i.e., $I_1 \neq Io$. The initial value I is stored in software distribution programs 1408 and 1805 at each receiving station terminal equipment. Numerical value (P) such as an initial value and an address required for executing the A1 software are written in the program parameter part 2803.

FIG. 16 is a flow chart showing the processes executed by the software distribution program 1408.

At step 2902, referring to the satellite communication information service destination list 1301 or LAN information service designation list 1302 of the file, a bit train (e.g., "1" || "1" || "0" || "1". . . ) corresponding to the supply information (e.g., A1 software) is read as destination information 1401 and stored in the memory.

At step 2903 a random number (R) of eight bits is generated under control of CPU and stored in the memory 1203 as random number information 1406. The information 1401 and 1203 is used in generating an enciphering key for enciphering information to be supplied, and is transmitted to each receiving station for generating a deciphering key.

At step 2904 each receiving station ID of one bit is read from the destination information 1401 in the memory 1203, a hash total is calculated for the ID and random number information 1406, and the calculated results are stored in the memory 1203 as the destination information 1401. For example, the ID numbers of bits of the destination information 1401 of the information A1 are L, D and E respectively of the information service unit 111 and receiving stations 116 and 118. Therefore, the common key K is given by the following equation:

$$K'_{DEL} \leftarrow h(I_2, "R" | "D" | "E" | "L")$$

The initial value $I_2$ is different from Io and $I_2$, i.e., $I_2 \neq Io$ and $I_2 \neq I_1$.

The initial value is a secret value stored in the information service unit 111 and each receiving station IC card.

This $K'_{DEL}$ (having an initial value Io) is an enciphering key (deciphering key) shared only between the information service unit 111 and the IC cards of the receiving stations 116 and 118, as will be described later.

Next, by using the common key $K'_{DEL}$ 1404, the hash total part 2802 (H) and a program parameter part 2803 (P) of the A1 software 1303 in the file 112 are enciphered (step 2905). The ciphertext can be expressed as follows:

$$H' \leftarrow Enc(K'_{DEL}, H)$$

$$P' \leftarrow Enc(K'_{DEL}, P)$$

The ciphertexts H' and P' are replaced with H and P of the A1 software 1307 and written in the memory 1203 at the ciphertext area 1402 (step 2905).

Figure 5C:
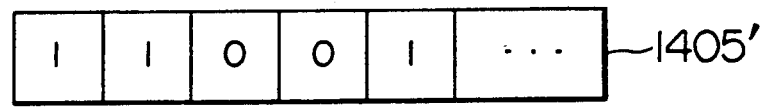

In generating the common key K'$_{DEL}$, there are used as input data for a hash total the random number information 1406 (R) and the ID information (D, E, L) of the destination information 1401. In order for the other receiving stations to be recognizable of the state of this data input, there is generated control information 1405' such as shown in FIG. 5C. Specifically, at the first bit of the control information 1405' a bit "1" is set indicating that random information was used, and at the second bit a bit "1" is set indicating that ID information of the destination information 1401 was used. The third bit of the control information 1405' indicates if there is ID information which is to be added to or was deleted from the ID information used as input data for generating a hash total. In this example, a bit "0" is set indicating that there is no information which is to be added or was deleted. In this case, no data is written in the memory 1203 at an addition/deletion ID information area 1407. At the fourth bit of the control information 1405', a bit "0" is set indicating that cryptographic communication is not carried out for all the program information to be transmitted. At the fifth bit of the control information 1405', a bit "1" is set indicating that information to be transmitted is software information (step 2906).

Next, the control information 1405, random number information 1406, destination information 1401 and ciphertext 1402 are transmitted via the communication management unit 1206 and earth station 113 (step 2907).

FIG. 17 is a flow chart showing the processes executed by the software distribution program 1805 in the memory 1602 at the receiving station 116 shown in FIG. 7.

The information sent from the information service unit 111, i.e., the control information 1405, random number information 1406, destination information 1401, ciphertext 1402, and the like are transferred to the hard disc 1610 via the earth station 115 (117, or 119), communication management unit 1604, and hard disc controller 1607. The transferred control information including the control information 1703, random number information 1704, destination information 1701, and software distribution ciphertext 1706 are stored in the hard disk 1610 (3001).

The control information 1703 is then read. After confirming that a bit "1" is being set at the first bit of the control information, the random information (R) stored in the random information area 1704 is read and stored in a working area 1804. After confirming that a bit "1" is being set at the second bit of the control information 1703, associated ID information D, E, and L are read and stored in the working area 1804 while referring to the destination information 1701 and ID information 1705 (step 3002). Next, an IC card call sub-routine 1805 is activated, and the ID information D, E, and L stored in the working area 1804 are transferred via the IC card reader 1605 to the IC card 1609 (step 3003).

On the side of the IC card, the processes shown in FIG. 12 are executed. In this case, the command or the fifth bit of the control information entered at step 2401 is "1", so that within the IC card a software protection program 2204 stored in ROM 2104 shown in FIG. 10 is activated to execute step 2404.

Next, in response to a return code from the IC card, the received program 1706 (A1 software) is executed (step 3004).

FIG. 18 is a detailed flow chart showing the software protection operation step 2404 among the processes executed by the IC card.

At step 3101 the initial value I of the hash function is set to a variable I$_2$, and the flag variable FLAG is set to 0.

At step 3102, there are supplied via the port 2103 the random number information and ID information obtained from the destination information. In the above example, "R", "D", "E", and "L" are supplied.

At step 3103 it is checked if the entered ID information contains the own ID 2201. If contained, the control advances to step 3104. If not, the control advances to step 3105.

In the above example, the entered ID information does not contain the own ID "D" so that the control advances to step 3104.

At step 3104, a bit "1" is set to the flag, i.e., FLAG←1.

At step 3105, using I$_2$ as a hash function initial value, a hash total of the entered ID information is generated. Namely, in the above example, K'$_{DEL}$←h (I$_2$, "R" || "D" || "E" || "L").

At step 3106 it [S Checked if there is any other ID information to be entered from the port 2103. If there is any other ID information, the control advances to step 3107. If not, the control advances to step 3108.

At step 3107, the initial value is changed. Namely, I$_2$←K'$_{DEL}$. Then the control returns to step 3102.

At step 3108 it is checked if the own ID has been processed or not. Namely, it is checked if FLAG=1 or not. If "NO", the control advances to step 3109. If "YES", the control advances to step 3110.

At step 3109, a return code "0" is outputted from the port 2103 to thereby terminate the control.

At step 3110, a return code "1" is outputted from the port 2103.

At step 3111, a calculated result K'$_{DEL}$ (=h (I$_2$, "R" || "D" || "E" || "L") of a hash total is written in the common key 2301 of the memory 2102 of the IC card.

At step 3112 the IC card waits for the next command.

The similar control is executed at the receiving station 118 to calculate K'$_{DEL}$ and hold it in the IC card.

At the receiving station 119, a different control is executed. Specifically, the IC card of the receiving station 119 is written with its own ID "F", and the entered ID information does not contain the ID "F". As a result, FLAG=0 at step 3108 and step 3111 is not executed and so K' is not held in the IC card.

As described above, each receiving station has its own ID card (containing the ID information "D" for example), and a common key can be generated from destination information of a plurality of receiving stations including the receiving station in concern, but not from destination information of a plurality of receiving stations not including the receiving station in concern.

Figure 19:
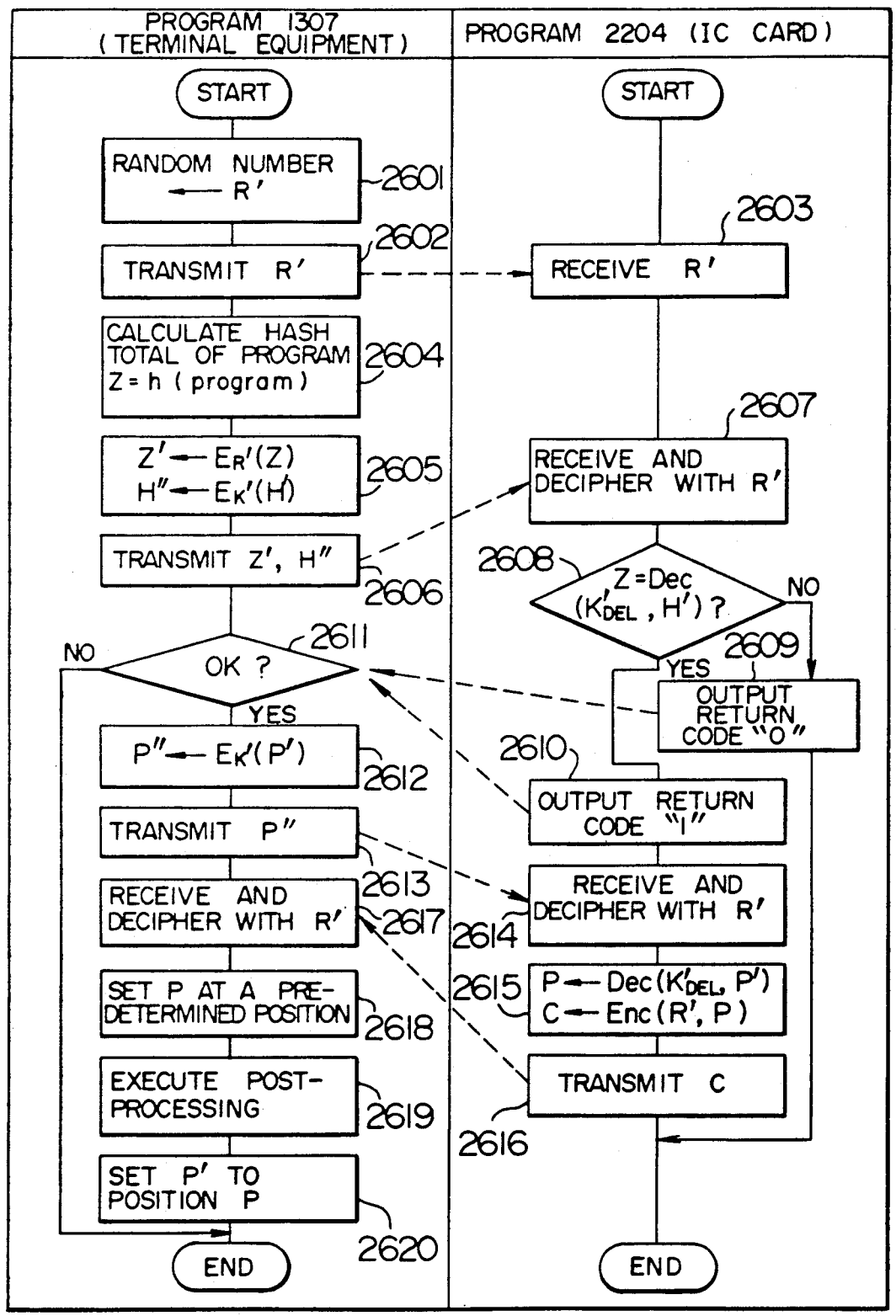
FIG. 19 is a flow chart of the processes executed by the software protection step in the flow chart shown in FIG. 12.

As described above, when the return code is sent from the IC card, the receiving station 116 executes the received program 1706 at step 3004 (FIG. 17). This program 1706 (A1 software 1307) is partially enciphered as shown in FIG. 15. The pre-processing part 2801 of this program executed at steps 2601 to 2618 shown in FIG. 19 performs an IC card call during the program execution. At the IC card call, the processes shown in the flow chart of FIG. 19 is executed.

At step 2601 there is generated a random number R' which is used as a cryptographic communication enciphering key between the IC card and the receiving station.

At step 2602, R' is transferred via the Ic card reader 1605 to the IC card 1609.

At step 2603 R' is written via the port 2103 into RAM 2102 at the working area 2302.

At step 2604 there is generated a hash total of a predetermined area (program) on the distributed program 1706.

$$Z \leftarrow h (I_1, \text{program})$$

The "predetermined area" herein means an area within which program alternation is checked as will be described later, e.g., the area 2804 shown in FIG. 15.

As described above, prior to distribution of the program to each receiving station, the information service unit 111 generates a hash total H of the predetermined area (program) of the A1 software, and H' obtained by enciphering the common key $K'_{DEL}$ is written in the hash total 2802. Namely, $$H \leftarrow h (I_1, \text{program})$$

$$H' \leftarrow Enc (K'_{DEL}, H)$$

where $K'_{DEL} = h (I_2, \text{"R"} \| \text{"D"} \| \text{"E"} \| \text{"L"})$ Z and H' are enciphered using the WS (work station)-IC card cryptographic communication enciphering key R' at each receiving station (step 605). Namely, $$Z' \leftarrow Enc (R', Z)$$

$$H'' \leftarrow Enc (R', H')$$

At step 2606 Z' and H" are transferred via the IC card reader 1605 to the IC card 1609.

At step 2607 Z' and H" are received from the port 2103 and written in RAM 2102 at the working area 2302.

At step 2608 Z' and H" written in the working area 2302 are deciphered using the deciphering key R', and it is checked if the hash total of the program under execution is coincident with the hash total of the original program. Namely, the following calculation is carried out.

$$Z \leftarrow Dec (R', Z')$$

$$H' \leftarrow Dec (R', H'')$$

$$H \leftarrow Dec (K'_{DEL}, H')$$

to check if Z=H.

If "NO", the control advances to step 2609, and if "YES" the control advances to step 2610.

Specifically, in the hash total area H 2802 of the A1 software shown in FIG. 15, the hash total of the program before transmission is written. If the program is altered during transmission or after reception of the program, i.e., if the program is altered to another program', then $h (I_1, \text{program'}) \neq h (I_2, \text{program})$ so that program alteration can be detected.

At step 2609 a return code "0" is outputted via the port 2103 to terminate the control.

At step 2610 a return code "1" is outputted via the port 2103.

If any alternation is made by third parties to the software program sent from the information service unit 111, then Z=H so that at step 2609 a return code "0" is outputted. The above steps may be used in detecting an alternation of data by third parties.

At step 2611 the return code is received from the IC card reader 1605. If the return code is "0", the control is terminated. If the return code is "1", the control advances to step 2612.

At step 2612, as described before, the program parameters necessary for the execution of the program are given as P' enciphered by the key $K'_{DEL}$. Namely, $P' = Enc (K'_{DEL}, P)$.

This P' is saved in the memory 1602 at the receiving station and enciphered using the cryptographic communication enciphering key R' of the WS (work station)-IC card at the receiving station. Namely, $$P'' \leftarrow Enc (R', P')$$

At step 2613 P" is transferred via the IC card reader 1605 to the Ic card 1609.

At step 2614 P" is received from the port 2103 and deciphered using K'. Namely, $$P \leftarrow Dec (R', P')$$

At step 2615 P' is temporarily deciphered using the common key $K'_{DEL}$ to obtain the original P. Thereafter, it is again enciphered using the cryptographic communication enciphering key R' of the IC card at the receiving station. Namely, $$P \leftarrow Dec (K'_{DEL}, P')$$

$$C \leftarrow Enc (R', P)$$

At step 2616 C is outputted via the port 2103.

At step 2617 C is inputted from the IC card reader and deciphered using R'. Namely, $$P \leftarrow Dec (R', C)$$

At step 2618 the program parameter P is set to an executable area. Namely, PARAM P where PARAM is a program variable which is written in the program beforehand in order to be set to P.

Next, at step 2619 the post-processing part 2804 of the A1 software is processed. This post-processing part corresponds to the portion performing image display and the like to be executed by the A1 software.

At step 2620 the parameter P' saved in the memory 1602 is read and set to the position of the deciphered parameter P.

Without the IC card, the program will not run, and if the program is altered it will run neither. The enciphering key $K'_{DEL}$ is automatically generated within the IC card in accordance With the ID information provided outside of the IC card, and is held within it. In other words, in this embodiment, there is provided a function not to move $K'_{DEL}$ out of the IC card, this function being realized by a known technique associated with IC cards.

Therefore, by using a different random number for each program, the software can be protected by using a correspondingly different common key. Furthermore, by using a different destination information for each receiving station, the software can be protected from third party receiving stations.

In the above embodiment, the information service unit transmits the address information in an ID table in order to designate an information destination. ID information not included in the ID table, random numbers, time information and the like may be additionally transmitted and used as the input data for generating a common key. In this case, the third bit of the control information 1405 is set to "1", and the bit indicating the addition/deletion of the ID information as well as the field in which the ID information to be added or deleted is provided in the control information 1405.

The information service unit transmits the address information of the ID table in order to designate the information destination. In this case, if the same address information is transmitted repetitively, such address information may be represented collectively as a pattern so that only a pattern name can be transmitted. If any receiving station included within the pattern is required to be added or deleted, the ID indicating the added or deleted receiving station may be included within the ID information and thereafter transmitted.

In such a case, a bit indicating that address information is represented by a pattern as well as the field in which the pattern name is written, is provided within the control information 1405.

In the above embodiment as the objects to be enciphered, not only character data (coded data) and program data, but also analog information such as analog images may be used. In this case, both the transmitter and receiver have an analog information cryptographic machine, and a generated common key may be used as parameters for generating a cryptographic key to be used by the analog information cryptographic machine.

In the above embodiment, the random information R and common key $K'_{DEL}$ are written in a volatile RAM the contents of which are erased upon power-off. Such information may be written in a non-volatile EEPROM provided within the IC card so as to hold the information even if power is turned off. The contents written in EEPROM may be arranged not to be erased so that the use history of the system may be checked for later toll calculation for example.

In the above embodiment, the IC card is used at a receiving station for generating a common key. Instead of the IC card, a handy portable computer or the like may be used whose internal circuits are hard to be changed physically.

Also in the above embodiment, the program to be transmitted and distributed is enciphered not wholly but partially. The program information may be enciphered wholly. In this case, the fourth bit of the control information shown in FIG. 5C is set to "1" to inform other receiving stations of such effect.

Furthermore, in calculating hash totals h ($I_1$, ...) and h ($I_2$, ...) for the program protection, the initial values $I_1$, and $I_2$ different from the initial value Io are used. Instead of calculating the hash totals h ($I_1$, ...) and h ($I_2$, ...), hash functions $h_1$ and $h_2$ different from the hash function h may be used. In this case, the hash function $h_1$ is possessed by the information service unit 111 and each receiving station terminal equipment, and the hash function $h_2$ is possessed by the information service unit 111 and the IC card at each receiving station, both functions being a secret function.

The inputted and processed data is written in a volatile RAM in the IC card so that the data is erased upon power-off. Instead, the program use history may be written in a non-volatile EEPROM provided in the IC card so as to hold the history even if power is turned off. In this case, the access number to the common key K' may be written in EEPROM and the contents thereof are arranged not to be erased, thereby allowing to check the use frequency of a program for later toll calculation for example.

Figure 20:
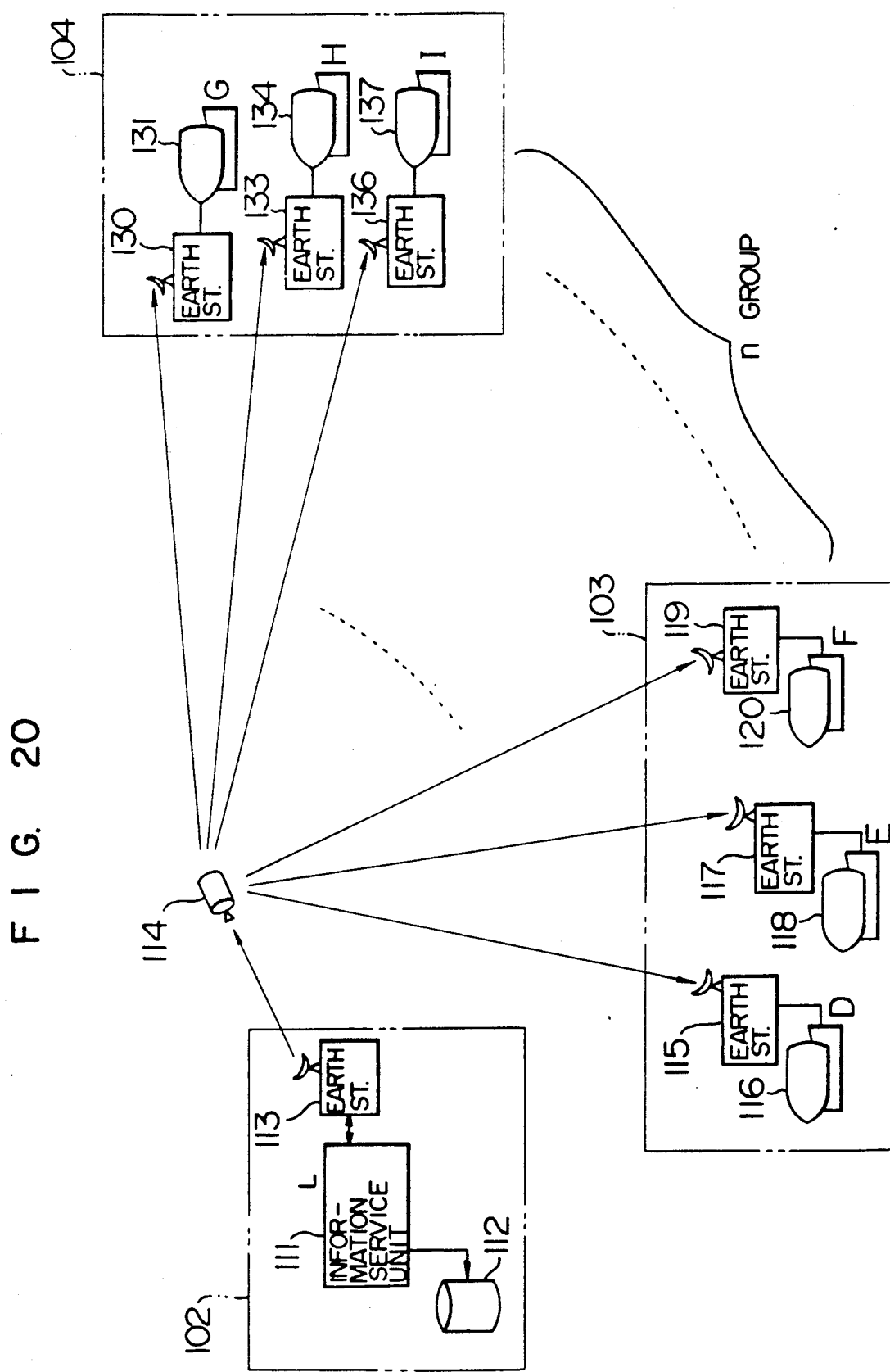
FIG. 20 shows the system arrangement of another embodiment.

Next, there will be described an embodiment as shown in FIG. 20 wherein information service is given to a particular receiving station among a plurality of receiving stations. In the foregoing embodiments, the management for information destination is carried out by the receiving stations within one information user group under broadcast communications. In contrast, in this embodiment, a plurality of receiving stations are grouped into logical m blocks on the basis of the types of supply information and on the basis of information management, and information service is given to a particular receiving station within a block. The structure of this embodiment is basically the same as that of the embodiment shown in FIG. 2 in that the information service facilities 102 supply information service to a plurality of receiving stations via a communication satellite 114. The receiving stations constitute in total m logical groups including the information user groups 103, . . . 104. The number of groups are determined by the information service facilities 102 as desired in accordance with the total number of receiving stations and service information types. This is easily done by the initial setting operation shown in FIG. 3A which adjusts the information service destination lists shown in FIGS. 6A and 6B.

First, at the start of operating the embodiment system, a similar initialization to that shown in FIG. 3A is executed to divide a plurality of receiving stations into m logical information service groups for the convenience of management. Information service destination list such as shown in FIG. 21 is generated on the basis of service information type basis for respective receiving stations within each block. Similar to the foregoing embodiments, the ID information for each receiving station is set and registered. In FIG. 21, the ID information is briefly shown by symbols such as D, E, and F. However, in a practical system, the ID information such as shown in FIGS. 26A and 26B is used.

Figure 22:
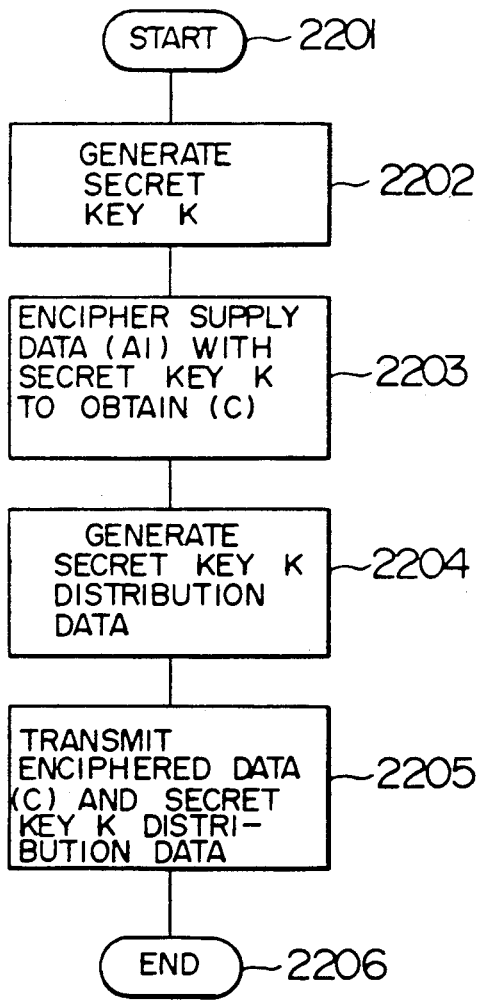
FIG. 22 is a flow chart illustrating the information service used with the information service system shown in FIG. 20.

After completion of the initialization process, the system is operated in accordance with the procedure shown in FIG. 22. First, a random number R common to all information service groups is generated and used as a common secrete key K (step 2202).

$$K \leftarrow R$$

Next, the supply data A1 is enciphered using the random number R (step 2203)

$$C \leftarrow Enc\,(R, A1)$$

There is executed a process of generating a secret key K distribution data (step 2204) to transmit an enciphered data (C) and secret key distribution data and thereafter terminate the control (step 2205).

The process of generating the secret key K distribution data at step 2204 will be detailed with reference to FIG. 23.

First, the receiving stations are divided into m blocks (steps 2302, 2303), and there is generated a common key GK(i) for particular receiving stations within the information user group (step 2305). If the information A1 is to be supplied only to the receiving stations 116 and 118 of the information user group 103, then $$GK(i) \leftarrow K_{DEL}$$

Next, the secret key K which is the random number common to all receiving stations is enciphered using the common key GK(i) (step 2306)

$$K'(i) = Enc(K_{DEL}, R)$$

The above processes are executed for all the m information user groups. The group common key GK(i) and secret enciphered data K'(i) are edited as a distribution data to which a group identifier is added and lastly a common service data is added, to thereby generate the format as shown in FIG. 25 (step 2308).

Figure 24:
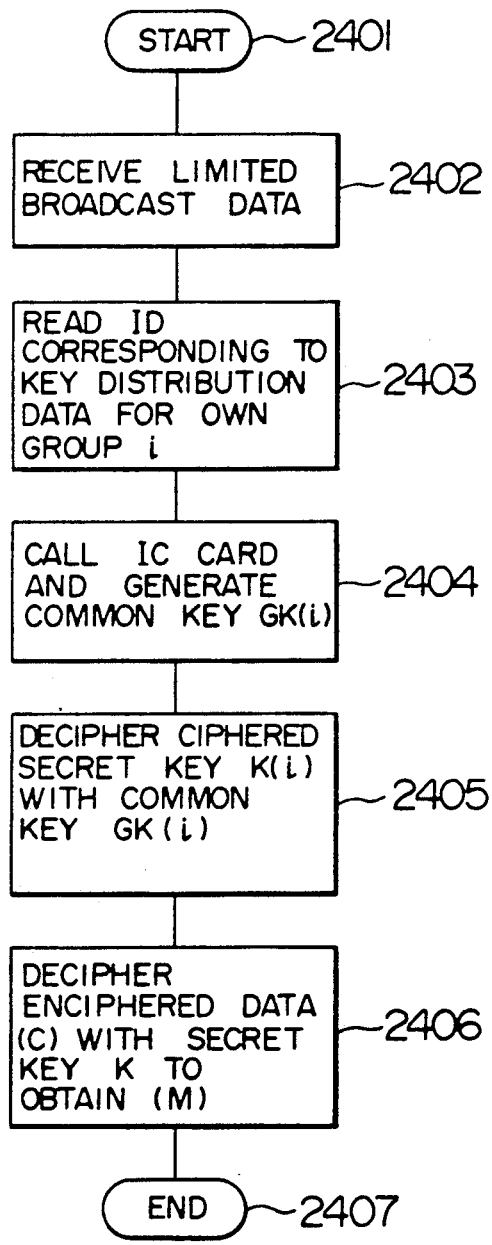
FIG. 24 is a flow chart illustrating the reception procedure at a receiving station used with the embodiment information service system shown in FIG. 20.
Figure 25:
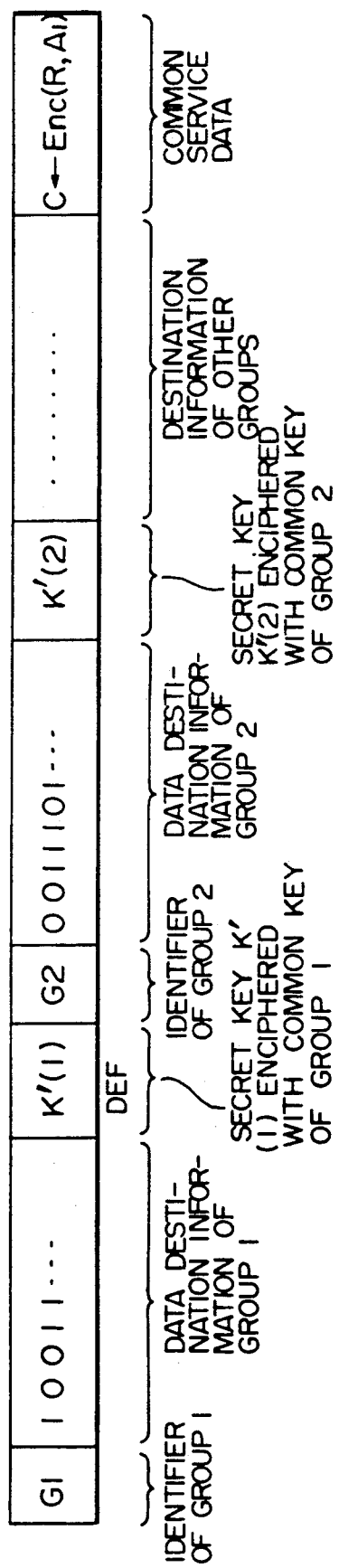
FIG. 25 shows an example of a format of destination control information, cryptographic secret key data, and common service data, respectively broadcast by the system shown in FIG. 20.

Information in the format shown in FIG. 25 broadcast to all the groups is received and processed by each information user group in accordance with the flow chart shown in FIG. 24.

Upon reception of broadcast data (step 2402), each information user group reads an ID corresponding to its own group key distribution data (e.g., the information user group 103 reads IDs D, E, and L and reads data from the IC card to generate the common key KG(i)) (step 2404).

$$GK(i) = K_{DEL}$$

Next, the enciphered secret key K'(i) is deciphered using the common key GK(i) (step 2405).

$$K = Dec(GK(i), K'(i))$$

The enciphered data (A1) is deciphered using the secret key K to obtain the original data M (step 2206).

$$M = Dec(K, C)$$

With the above processes, a desired data becomes serviceable to a particular receiving station within an information user group among the different m logical groups.

In this embodiment, each receiving station generates a common key depending not upon all other receiving stations of the information service system, but upon only other receiving stations within its own group.

In the secret key K distribution data shown in FIG. 25, without using the identifier of each group a predetermined data format may be used in order to read destination control information of each group. With such an arrangement, it is possible to shorten the length of the secret key K distribution data generated and processed by the information service facilities.

Furthermore, in the secret key K distribution data shown in FIG. 25, in addition to the identifier of each group and the enciphered secret key, data such as a random number used in generating the common key to all the groups may be added to the secret key K distribution data. With such an arrangement, it is possible to change the type of the group common key in accordance with the time when a secret key is distributed and in accordance with the type of the distributed secret key.

The above-described advantages are also given to the case where the receiving station 108 of the group 103 can receive information service at a different group, e.g., at the group 104, by using the IC card for generating a key and the ID information of the associated receiving stations of the group 103, thereby allowing to receive information service at a different group with ease.

Consider the case where a receiver at the receiving station of the group 103 has only the IC card for generating a key and has not the ID information of the associated receiving stations of the group 103, and the receiving station 108 desires to receive information service at a different station such as the receiving station 117 of the group 104. In such a case, the secret key of the authorized receiving station 109 of the group 103 or of the receiving station 110 having authorized key sharing service may be shared by both the receiving station 109 and the receiving station 108 at the different group, in accordance with the cipher communication control under the ID base key management.

As a result, even if the sufficient ID information of a group is not supplied, the secret key can be obtained easily by an authorized receiving station.

In the case where the IC card for generating a key has a communication function and a receiving station of one group intends to receive information service at another group, the secret key obtained by the authorized receiving station of the one group may be shared by both the receiving stations in accordance with the cipher communication control under the ID base key management basing upon the authorized receiving station ID information.

As a result, even if the sufficient ID information is not supplied, the secret key can be obtained easily by an authorized receiving station.

In a real information service system, it is necessary to speed up and reduce a load in generating a key at a receiving station. A calculation of a key generation time was carried out and given as in the following (refer to Takaragi et al, 1990. A cryptographic Method of Software Protection in the Multi-Destination Delivery, SCIS 90, The Institute of Electronic Information and Communication Engineers.)

Assuming that one group has 1000 receiving station terminal equipments and 1:1000 cipher communications are carried out, the time required for generating a cryptographic key within an IC card is about 64 bits×1000/80 Kbps=0.8 second. However, prior to this process it is necessary to input 64 bits×1000=64K bits data to the IC card. It takes an I/O time of 64K bits/9.6 Kbps=6.7 seconds. Therefore, in order to share two cryptographic keys in the cipher communications, the IC card requires 6.7+0.8×2=8.3 second or more. This time of 8.3 second and more is small and negligible as compared with the interval of downloading computer programs and the downloading time.

Consider that there are 10,000,000 receiving station terminal equipments which are divided into 10,000 logical groups. The secret key K distribution data generated and distributed by the information service facilities is about 10,000,000 bits (destination information)+64 bits (enciphered secret data)×10,000+8 bits (group identifier)×10,000=10,720M bits. If a communication satellite is used, a capacity of about 15 Mbps or more is possible so that a reception time of the secret key K distribution data will be about 1 second. Accordingly, a common key generating time at each group is about 8.3 second, and the deciphering speed of an ciphered secret key by the common key is 2.7 Mbps (using as the cryptographic scheme, a Hisecurity-Multi scheme). As a result, it takes about 10 seconds for each receiving station to obtain a secret key after the start of operation of the information service facilities. As above, the common key generating time is scarcely influenced by the number of receiving stations within the system so that a key generating time required by an information user is almost independent from an increase of the number of receiving stations.

What is claimed is:

1. An information service system comprising a plurality of information user groups each group having a plurality of receiving stations, and information service facilities for providing desired service information through broadcast communications to desired receiving stations of each of said plurality of information user groups;

said information service facilities comprising means for storing ID name information composed of receiving station identifiers assigned beforehand to all receiving stations of said information service system, said receiving station identifiers being disposed in a predetermined order; means for storing a plurality of information to be supplied to said plurality of receiving stations; enciphering means for generating an enciphering key for said desired receiving stations performing said broadcast communications within said information user group, and enciphering said service information by using said enciphering key; and means for transmitting through said broadcast communications said enciphered service information and service destination codes of service receiving destination stations encoded from said ID information; and said each receiving station comprising means for storing its own receiving station identifier and said ID information composed of receiving station identifiers of all receiving stations within one information group performing said broadcast communications; a receiving unit for receiving said enciphered service information service and said service destination codes from said information service facilities; and deciphering means for generating a deciphering key for said ID information corresponding to said service destination codes, in accordance with said received service destination codes and corresponding said ID name information stored beforehand, only when said own receiving station identifier is contained in said service destination codes.

2. An information service system according to claim 1, wherein said storing means for storing said own receiving station identifier and said deciphering means are implemented within a circuit unit removable relative to said each receiving station.

3. An information service system according to claim 1, wherein said storing means of said information service facilities has a table which stores a distribution destination information deriving code for deriving a service destination code of a service receiving destination station, said distribution destination information deriving code being registered beforehand for each particular service information, said enciphering means sends said enciphered particular service information and corresponding said distribution destination information deriving code for each of said broadcast communications of said particular service information, and said deciphering means of said each receiving station performs said deciphering process only when said own receiving station identifier is contained within said distribution destination information deriving code.

4. An information service system according to claim 3, wherein said storing means for storing said own receiving station identifier and said deciphering means are implemented within a circuit unit removable relative to said each receiving station.

5. An information service system according to claim 1, wherein said enciphering means of said information service facilities generates an enciphering key by calculating a hash total value of a random number and said service receiving destination station identifiers, and transmits said service information after enciphering said service information with said enciphering key.

6. An information service system according to claim 1, wherein said deciphering means of said receiving station generates a deciphering key by calculating a hash total value of a random number and said received service receiving destination station identifiers, and deciphers said enciphered and received service information with said deciphering key.

7. An information service system having information service facilities for providing through broadcast communications desired service information to a plurality of information user groups each having a plurality of receiving stations;

said information service facilities comprising means for storing ID name information of receiving station identifiers disposed in a predetermined order; enciphering means for generating a secret key common to all said information user groups, enciphering said service information with said secret key, generating a common key to said information user groups corresponding to said ID name information, and enciphering said common secret key with said common key; and means for transmitting to all said information user groups through broadcast communications said service information and secret key enciphered by said enciphering means and each group identifier, and destination information for each group; and said each receiving station comprising means for storing said ID name information of subscriber identifiers of each information user group belonging to said each receiving station; means for receiving through broadcast communications information from said information service facilities; means for storing an own subscriber identifier of said each receiving station; and deciphering means for generating a common key from said ID information of said each information user group only when said own subscriber identifier is contained in said destination information of said each information user group received by said receiving means, deciphering said enciphered secret key with said common key, and deciphering said enciphered service information with said deciphered secret key.

8. An information service system according to claim 7, wherein said storing means of said receiving station and said deciphering means are implemented within a circuit unit removable relative to said each receiving station.

9. An information service system according to claim 7, wherein said information service facilities have a table which stores distribution destination information set deriving codes for deriving a set of service information distribution destination information of a set of said identifier information for each group, and transmits said distribution destination information deriving code at the time of broadcast communications, and said deciphering means of said receiving station performs said deciphering process only when said own subscriber identifier is contained within said distribution destination information deriving codes.

10. An information service station according to claim 7, wherein said information service facilities generate said secret key common to all said information user groups by using a random number, and said common key for each information user group is generated from a hash total of identifiers of all receiving stations of each information user group.

11. An information service system according to claim 9, wherein said information service facilities logically allocate said receiving stations to said information user groups by forming said table on the basis of each predetermined information user group.

12. An information service method for an information service system comprising a plurality of information user groups each group having a plurality of receiving stations, and information service facilities for providing desired service information through broadcast communications to desired receiving stations of each of said plurality of information user groups:

said each receiving station storing beforehand its own receiving station identifier, and being provided with a circuit unit removable relative to said each receiving station, said each receiving station and said information service facilities storing ID name information of all receiving station identifiers disposed in a predetermined order;

said information service facilities generating an enciphering key for said ID name information basing upon said ID name information, enciphering said service information with said enciphering key, and transmitting through broadcast communications said ciphered service information and said ID name information for service destinations to a particular information user group; and said removable circuit unit of said receiving station generating a deciphering key only when said own receiving station identifier is contained in said ID name information for said service destinations, and deciphering said service information with said deciphering key.

13. An information service method according to claim 12, wherein said information service facilities store distribution destination information set deriving codes for deriving a distribution destination information set of a plurality of subscriber identifiers for service of particular information, and transmit said distribution destination information set deriving codes and said enciphered service information through broadcast communications, and said receiving station performs said deciphering process only when said own subscriber identifier stored in said circuit unit is contained within said distribution destination information deriving codes.

14. An information service system comprising a plurality of information user groups each group having a plurality of receiving stations, and information service facilities for providing desired service information through broadcast communications to desired receiving stations of each of said plurality of information user groups;

said information service facilities comprising enciphering means for enciphering said service information by using a distribution destination information set composed of identifiers of receiving station subscribers to which said service information is supplied, and means for transmitting said enciphered service information and said distribution destination information set; and said receiving station comprising deciphering means for deciphering said enciphered service information by using said transmitted distribution destination information set, means for storing an own subscriber identifier of said receiving station, and identifier means for performing said deciphering process only when said own subscriber identifier is contained in said distribution destination information set.

15. An information service system according to claim 14, wherein said identifier means and storing means are implemented within a circuit unit removable with respect to said receiving station.

16. An information service method for an information service system comprising a plurality of information user groups each group having a plurality of receiving stations, and information service facilities for providing desired service information through broadcast communications to desired receiving stations of each of said plurality of information user groups:

said information service facilities generating an enciphering key in accordance with a subscriber identifier set of service destination subscriber identifiers, enciphering a program with said enciphering key, and transmitting said subscriber identifier set and said enciphered program, and said receiving station comprising an IC card for storing an own identifier of said receiving station and means for inputting/outputting data relative to said IC card, a deciphering key being generated from said subscriber identifier set when said own subscriber identifier stored in said IC card is contained within said subscriber identifier set, a first process is being carried out in said IC card, by said first process a deciphered program being generated from said enciphered program by using said deciphering key, said enciphered program being saved in a first memory and written in a second memory to execute said deciphered program when said deciphered program is outputted from said IC card, and said deciphered program being changed to said enciphered program to terminate the program execution.

17. An information service method according to claim 16, wherein a predetermined area of said program is written with a hash total associated with said program before transmission from said information service facilities, said receiving station generates a hash total of said received program, said hash total written in said program and said hash total generated by said receiving station are enciphered and sent to said IC card to compare both said hash total values, and only when both said hash total values are coincident with each other, said program is deciphered within said IC card.

18. An information service method for an information service system having information service facilities for providing through broadcast communications desired service information to a plurality of information user groups each having a plurality of receiving stations, comprising the following steps to be executed by said information service facilities:

generating a secret key common to all said information user groups;

enciphering said service information with said common secret key;

generating a common key for an information user group from the identifiers of service receiving destination stations of said information user group;

generating a secret key enciphered data by enciphering said common secret key with said common key; and editing, as a distribution data, a service destination data of said identifiers of service receiving destination stations of said information user group, said secret key enciphered data and said service information, and transmitted said distribution data.

19. An information service method according to claim 18, wherein said method comprises the following steps to be executed by said receiving station:

generating a common key of said information user group to which said receiving station belongs, in accordance with the identifiers of service receiving destination stations of said information user group;

generating a secret key by deciphering said enciphered secret key with said common key; and deciphering said enciphered service information with said secret key.

* * * * *